(12) United States Patent
Groen et al.

(10) Patent No.: US 7,406,118 B2
(45) Date of Patent: Jul. 29, 2008

(54) PROGRAMMABLE LOGIC DEVICE INCLUDING PROGRAMMABLE MULTI-GIGABIT TRANSCEIVERS

(75) Inventors: Eric D. Groen, Ankeny, IA (US); Charles W. Boecker, Ames, IA (US); William C. Black, Ames, IA (US); Scott A. Irwin, Ames, IA (US); Joseph N. Kryzak, Ames, IA (US); Yiqin Chen, Ames, IA (US); Andrew G. Jenkins, Nevada, IA (US); Aaron J. Hoelscher, Ankeny, IA (US)

(73) Assignee: Xilinx, Inc., San Jose, CA (US)

( * ) Notice: Subject to any disclaimer, the term of this patent is extended or adjusted under 35 U.S.C. 154(b) by 867 days.

(21) Appl. No.: 10/661,016

(22) Filed: Sep. 11, 2003

(65) Prior Publication Data

US 2005/0058187 A1 Mar. 17, 2005

(51) Int. Cl.
H04B 1/38 (2006.01)
(52) U.S. Cl. .................................... 375/219
(58) Field of Classification Search ................ 375/354, 375/355, 371–373, 376, 295, 259, 326, 316, 375/324, 322, 219–223; 455/73; 370/366; 327/141–158
See application file for complete search history.

(56) References Cited

U.S. PATENT DOCUMENTS

| 5,537,607 | A | 7/1996 | Ploger, III |
| 5,918,068 | A | 6/1999 | Shafe' |
| 5,970,254 | A | 10/1999 | Cooke et al. |
| 5,991,546 | A | 11/1999 | Chan et al. |
| 6,011,407 | A | 1/2000 | New |
| 6,167,077 | A | * 12/2000 | Ducaroir et al. ............. 375/219 |
| 6,185,205 | B1 | 2/2001 | Sharrit et al. |
| 6,201,829 | B1 | * 3/2001 | Schneider ................... 375/221 |
| 6,211,697 | B1 | 4/2001 | Lien et al. |
| 6,266,799 | B1 | * 7/2001 | Lee et al. ....................... 716/6 |
| 6,308,311 | B1 | 10/2001 | Carmichael et al. |
| 6,370,603 | B1 | 4/2002 | Silverman et al. |
| 6,477,611 | B1 | 11/2002 | Chang |
| 6,608,638 | B1 | 8/2003 | Kodosky et al. |
| 6,664,833 | B1 | 12/2003 | Fischer |

(Continued)

OTHER PUBLICATIONS

Carl Carmichael et al.; XAPP216 (v1.0); "Correcting Single-Event Upsets Through Virtex Partial Configuration"; Jun. 1, 2000; available from Xilinx, Inc., 2100 Logic Drive, San Jose, CA 95124.

(Continued)

*Primary Examiner*—Mohammed Ghayour
*Assistant Examiner*—Vineeta Panwalkar
(74) *Attorney, Agent, or Firm*—James Harrison; Michael R. Hardaway

(57) ABSTRACT

A programmable logic device includes a plurality of programmable multi-gigabit transceivers, programmable logic fabric, and a control module. Each of the plurality of programmable multi-gigabit transceivers is individually programmed to a desired transceiving mode of operation in accordance with a plurality of transceiver settings. The programmable logic fabric is operably coupled to the plurality of programmable multi-gigabit transceivers and is configured to process at least a portion of the data being transceived via the multi-gigabit transceivers. The control module is operably coupled to produce the plurality of transceiver settings based on a desired mode of operation for the programmable logic device.

39 Claims, 13 Drawing Sheets

U.S. PATENT DOCUMENTS

| | | | |
|---|---|---|---|
| 6,766,406 | B1 | 7/2004 | Gasperini et al. |
| 6,798,828 | B1* | 9/2004 | Phanse ....................... 375/219 |
| 6,957,283 | B2 | 10/2005 | Dhir et al. |
| 7,142,557 | B2 | 11/2006 | Dhir et al. |
| 2001/0009553 | A1* | 7/2001 | Homann ..................... 370/445 |
| 2001/0028397 | A1 | 10/2001 | Nakamura |
| 2001/0038674 | A1* | 11/2001 | Trans ......................... 375/355 |
| 2001/0055331 | A1* | 12/2001 | Agazzi et al. ............... 375/216 |
| 2002/0034222 | A1* | 3/2002 | Buchwald et al. ........... 375/232 |
| 2003/0062922 | A1 | 4/2003 | Douglass et al. |
| 2003/0093598 | A1 | 5/2003 | Park |
| 2003/0161353 | A1* | 8/2003 | Kuo et al. ................... 370/537 |
| 2003/0163298 | A1 | 8/2003 | Odom et al. |
| 2004/0012447 | A1* | 1/2004 | Nagaishi et al. ................ 331/2 |
| 2004/0088468 | A1 | 5/2004 | Hasegawa |
| 2005/0084076 | A1 | 4/2005 | Dhir et al. |

OTHER PUBLICATIONS

Xilinx, Inc., U.S. Appl. No. 10/007,842, filed Dec. 3, 2001 by Dhir et al.

U.S. Appl. No. 10/659,803, filed Sep. 11, 2003, Black et al.

U.S. Appl. No. 10/659,819, filed Sep. 11, 2003, Groen et al.

U.S. Appl. No. 10/659,974, filed Sep. 11, 2003, Kryzak et al.

U.S. Appl. No. 10/659,979, filed Sep. 11, 2003, Kryzak et al.

U.S. Appl. No. 10/660,062, filed Sep. 11, 2003, Groen et al.

U.S. Appl. No. 10/660,191, filed Sep. 11, 2003, Kryzak et al.

U.S. Appl. No. 10/660,448, filed Sep. 11, 2003, Groen et al.

Altera Corporation; "Stratix GX Device Family — The Low-Risk Path to 3.125-Gbps Transceiver Applications"; available from wysiwyg://144http://www.altera.com/products/devices/stratixgx/sgx-index/jsp; downloaded Jul. 2, 2003; three pages.

Altera Corporation; "Stratix GX Multi-Gigabit Transceiver Block Technical Details"; Page URL: http://www.altera.com/products/devices/stratixgx/features/sgx-transceiver.html; downloaded Jul. 2, 2003; four pages.

Universal Serial Bus Specification Revision 2.0, Apr. 27, 2000, pp. ii-xxvii, 143, 280, & 332.

\* cited by examiner programmable logic device 10 programmable MGT 14 - 28 programmable MGT 14 - 28 programmable logic device 80 programmable PMA module 40 programmable transmit PMA module 38 programmable receive PCS module 44 programmable transmit PCS module 42

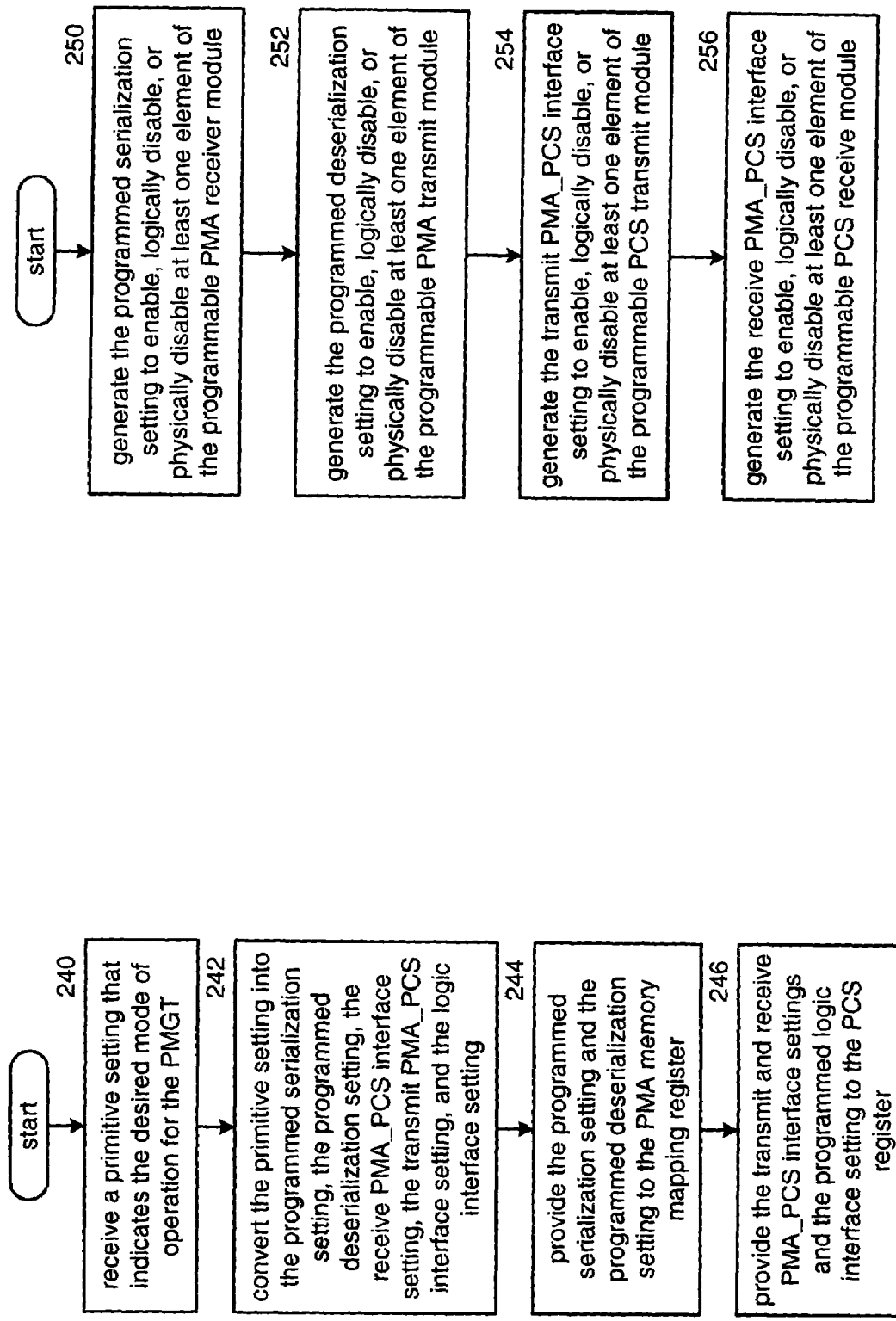

| Address | Register Name | 7 | 6 | 5 | 4 | 3 | 2 | 1 | 0 |
|---|---|---|---|---|---|---|---|---|---|
| 0x00 | MASTERBIAS | | | | | | | MASTERBIAS[1:0] | |
| 0x01 | TXDIVRATIOLO | TXDIVRATIO[7:0] | | | | | | | |
| 0x02 | TXDIVRATIOHI | IBOOST | | | | | TXBUSWID | | TXDIVRATIO[9:8] |
| 0x03 | TXLOOPFILTER | | | | TXLOOPFILTERR[1:0] | | | TXLOOPFILTERC[1:0] | |
| 0x04 | TXMODECONTROL | TXREG[1:0] | | TXVSEL[1:0] | | TXVCOGAIN | TXVCODAC | | TXCPI |
| 0x05 | TXOUTPUTLEVEL | | SLEW | EMPOFF | PRDRVOFF | TXDOWNLEVEL[3:0] | | | |
| 0x06 | TXOUTPUTMODE | | | TXANASW | TXDIGSW | TXEMPHLEVEL[3:0] | | | |
| 0x07 | RXDIVRATIOLO | RXDIVRATIO[7:0] | | | | | | | |
| 0x08 | RXDIVRATIOHI | | | | | RXDIVRATIO[13:8] | | | |
| 0x09 | RXLOOPFILTER | | | | RXLOOPFILTERR[2:0] | | | RXLOOPFILTERC[1:0] | |
| 0x0A | RXMODE0 | RXREG[1:0] | | RXVSEL[1:0] | | RXVCOGAIN | RXVCODAC | RXCPI | RXVCOSW |
| 0x0B | RXMODE1 | | RXCPGAIN | RXVSELCP[1:0] | | | | | |
| 0x0C | RXFEICONTROL0 | RXFER[1:0] | | | | | RXFEI[1:0] | | |
| 0x0D | RXFEICONTROL1 | | | | RXFER[9:2] | | | | VSELAFE[1:0] |
| 0x0E | \<reserved\> | | | | | | | | |
| 0x0F | POWERCONTROL | TXDRVEN | RXEN | TXEN | | RXANAEN | TXDIGEN | TXANAEN | BIASEN |
| 0x10–0x3F | \<reserved\> | | | | | | | | |

Figure 11
PMA memory mapped register 45

| Primitive | Standard | Serial Rate | Encoding | Fabric Interface |
|---|---|---|---|---|
| GT10_CUSTOM | - | ≤10.3125 Gbps | Any | 8b-80b |
| GT10_10GFC_8 | 10G Fibre Channel | 10.51875 Gbps | 64b/66b | 64b@159.37MHz |
| GT10_10GFC_4 | 10G Fibre Channel | 10.51875 Gbps | 64b/66b | 32b@318.75MHz |
| GT10_AURORAX_8 | AuroraX | ≤10.3125 Gbps | 64b/66b | 64b@156.25MHz |
| GT10_AURORAX_4 | AuroraX | ≤10.3125 Gbps | 64b/66b | 32b@312.5MHz |
| GT10_10GE_8 | 10GE 10GBase-R | 10.3125 Gbps | 64b/66b | 64b@156.25MHz |
| GT10_10GE_4 | 10GE 10GBase-R | 10.3125 Gbps | 64b/66b | 32b@312.5MHz |
| GT10_OC192_8 | SONET OC-192 | 9.95328 Gbps | None | 64b@155.52MHz |
| GT10_OC192_4 | SONET OC-192 | 9.95328 Gbps | None | 32b@311.02MHz |

Figure 12A

| Primitive | Standard | Serial Rate | Encoding | Fabric Interface |
|---|---|---|---|---|
| GT10_FCXAUL_4 | 10GFC (XAUI) | 3.1875 Gbps | 8b/10b | 32b@79.6875MHz |
| GT10_FCXAUL_2 | 10GFC (XAUI) | 3.1875 Gbps | 8b/10b | 16b@159.375MHz |
| GT10_FCXAUL_1 | 10GFC (XAUI) | 3.1875 Gbps | 8b/10b | 8b@318.75MHz |
| GT10_XAUL_4 | 10GE (XAUI) | 3.125 Gbps | 8b/10b | 32b@78.125MHz |
| GT10_XAUL_2 | 10GE (XAUI) | 3.125 Gbps | 8b/10b | 16b@156.25MHz |
| GT10_XAUL_1 | 10GE (XAUI) | 3.125 Gbps | 8b/10b | 8b@312.5MHz |
| GT10_AURORA_4 | Aurora | 3.125 Gbps | 8b/10b | 32b@78.125MHz |
| GT10_AURORA_2 | Aurora | 3.125 Gbps | 8b/10b | 16b@156.25MHz |
| GT10_AURORA_1 | Aurora | 3.125 Gbps | 8b/10b | 8b@312.5MHz |

Figure 12B

| Primitive | Standard | Serial Rate | Encoding | Fabric Interface |
|---|---|---|---|---|
| GT10_INFINIBAND_4 | InfiniBand | 2.5 Gbps | 8b/10b | 32b@62.5MHz |
| GT10_INFINIBAND_2 | InfiniBand | 2.5 Gbps | 8b/10b | 16b@125MHz |
| GT10_INFINIBAND_1 | InfiniBand | 2.5 Gbps | 8b/10b | 8b@250MHz |
| GT10_3GIO_4 | PCI Express | 2.5 Gbps | 8b/10b | 32b@62.5MHz |
| GT10_3GIO_2 | PCI Express | 2.5 Gbps | 8b/10b | 16b@125MHz |
| GT10_3GIO_1 | PCI Express | 2.5 Gbps | 8b/10b | 8b@250MHz |
| GT10_OC48_4 | SONET OC-48 | 2.488 Gbps | None | 32b@77.76MHz |
| GT10_OC48_2 | SONET OC-48 | 2.488 Gbps | None | 16b@155.52MHz |
| GT10_OC48_1 | SONET OC-48 | 2.488 Gbps | None | 8b@311.04MHz |

Figure 12C

PROGRAMMABLE LOGIC DEVICE INCLUDING PROGRAMMABLE MULTI-GIGABIT TRANSCEIVERS

BACKGROUND OF THE INVENTION

1. Technical Field of the Invention

This invention relates generally to general-purpose integrated circuits and more particularly to programmable logic devices.

2. Description of Related Art

Programmable devices are a class of general-purpose integrated circuits that can be configured for a wide variety of applications. Such programmable devices have two basic versions, mask programmable devices, which are programmed only by a manufacturer, and field programmable devices, which are programmable by the end-user. In addition, programmable devices can be further categorized as programmable memory devices or programmable logic devices. Programmable memory devices include programmable ready-only memory (PROM), erasable programmable read-only memory (EPROM) and electronically erasable programmable read-only memory (EEPROM). Programmable logic devices include programmable logic array (PLA) devices, programmable array logic (PAL) devices, erasable programmable logic devices (EPLD), and programmable gate arrays (PGA).

Field programmable gate arrays (FPGA) have become very popular for telecommunication applications, Internet applications, switching applications, routing applications, et cetera. Generally, an FPGA includes a programmable logic fabric and a programmable input/output section. The programmable logic fabric may be programmed to perform a wide variety of functions corresponding to the particular end-user applications. The programmable logic fabric may be implemented in a variety of ways. For example, the programmable logic fabric may be implemented in a systematic array configuration, a row base configuration, a sea-of-gates configuration, or a hierarchical programmable logic device configuration.

The programmable input/output section is fabricated on the perimeter of a substrate supporting the FPGA and provides coupling to the pins of the integrated circuit package allowing users access to the programmable logic fabric. Typically, the programmable input/output section includes a number of serial/deserial transceivers to provide access to the programmable logic fabric. Such transceivers include a receiver section that receives incoming serial data and converts it into parallel data and a transmitter section that converts outgoing parallel data into an outgoing serial data stream.

Since FPGA's are used in a wide variety of applications, which are typically governed by one or more standards; the transceivers are programmed, to some degree, to support the appropriate standard. As such, the receiver section is programmed to convert serial data into parallel data and the transmitter section is programmed to convert parallel data into serial data in accordance with the same standard. This, however, provides a limitation in the use of an FPGA in that the transmit path and receive path must be coupled to the same device, or devices that conform to the same standard. Thus, using today's FPGA, if an application requires the FPGA to receive data from one device in accordance with a $1^{st}$ standard and transmit process data to another device in accordance with a $2^{nd}$ standard, the FPGA would have to dedicate 2 transceivers: 1 for the receiving of data and the other for the transmitting of data. In this example, the transmitter section of the $1^{st}$ transceiver is always idle and the receiver section of the $2^{nd}$ transceiver is always idle. In the heavily competitive integrated circuit market, having die area consumed by unused circuitry is extremely costly.

In addition, the transceivers of an FPGA are programmed in accordance with a particular standard being supported by the FPGA. As such, each of the transceivers is programmed to support the same standard. As such, the devices to which the FPGA is coupled must also conform to the same standard. As such, the flexibility of usage of an FPGA is limited by requiring the environment in which it resides to utilize the same standard.

Further, the transceivers of the I/O section use a different clock domain than the programmable logic fabric. As the speed of the incoming and outgoing serial data increases well into the gigabit-per-second range, the separate clock domains of the input/output section and the programmable logic fabric are presenting synchronization issues between the two sections, resulting in corruption of data.

Therefore, a need exists for a universally programmable FPGA that provides universally programmable transceivers and further provides universal synchronization.

BRIEF SUMMARY OF THE INVENTION

The programmable logic device including programmable multi-gigabit transceivers of the present invention substantially meets these needs and others. In one embodiment, a programmable logic device includes a plurality of programmable multi-gigabit transceivers, programmable logic fabric, and a control module. Each of the plurality of programmable multi-gigabit transceivers is individually programmed to a desired transceiving mode of operation in accordance with a plurality of transceiver settings. The programmable logic fabric is operably coupled to the plurality of programmable multi-gigabit transceivers and is configured to process at least a portion of the data being transceived via the multi-gigabit transceivers. The control module is operably coupled to produce the plurality of transceiver settings based on a desired mode of operation for the programmable logic device. As such, via the transceiver settings, each of the multi-gigabit transceivers may be programmed in accordance with a different standard such that the programmable logic device, which may be an FPGA, can communicate in a multi-standard environment.

In another embodiment, the programmable logic device includes a clock management module, a transmit physical media attachment (PMA) module, a receive physical media attachment (PMA) module, a transmit physical coding sub-layer (PCS) module, a receive physical coding sub-layer (PCS) module, and programmable logic fabric. The clock management module is operably coupled to provide a reference clock from one of a plurality of clock sources to the transmit PMA module and the receive PMA module.

The transmit PMA module generates a parallel transmit clock, the serial transmit clock and a transmit programmable logic clock based on the reference clock. The transmit PMA module provides the parallel transmit clock to the transmit PCS module and the transmit programmable logic clock to the programmable logic fabric. The programmable logic fabric utilizes the transmit programmable logic clock to produce transmit data words, which are provided to the transmit PCS module in accordance with parallel transmit clock and/or the transmit programmable logic clock. The transmit PCS module utilizes the parallel transmit clock to convert the transmit data words into parallel transmit data to provide the parallel transmit data to the transmit PMA module. The transmit PMA module utilizes the parallel and serial transmit clocks to convert the parallel transmit data into a transmit serial data stream.

The receive physical media attachment (PMA) module is operably coupled to generate a serial receive clock, a parallel receive clock, and a receive programmable logic clock. The receive PMA modules uses the serial receive clock and the parallel receive clock to convert serial received data into parallel receive data. The receive PMA module provides the parallel receive data to the receive physical coding sub-layer (PCS) module in accordance with the parallel receive clock. The receive PCS module utilizes the parallel receive clock to convert the parallel received data into received data words and to provide the received data words to the programmable logic fabric. The programmable logic fabric utilizes the receive programmable logic clock to process the received data words. As such, synchronization is obtained throughout the programmable logic device.

An embodiment of a programmable multi-gigabit transceiver includes a programmable physical media attachment (PMA) module, a programmable physical coding sub-layer (PCS) module, a programmable interface, and a control module. The programmable PMA module is operably coupled to serialize high-speed output data in accordance with a programmed serialization setting and deserialize high-speed input data in accordance with a programmed deserialization setting to produce deserialized high-speed input data. The programmable PCS module is operably coupled to provide the high-speed output data to the programmable PMA module in accordance with a transmit PMA_PCS interface setting and to receive the deserialized high-speed input data from the programmable PMA module in accordance with a receive PMA_PCS interface setting. The programmable interface operably couples the programmable PCS module to the programmable logic section in accordance with a programmed logic interface setting. The control module is operably coupled to generate the programmed serialization setting, the programmed deserialization setting, the receive PMA_PCS interface setting, the transmit PMA_PCS interface setting and the logic interface setting based on a desired mode of operation for the programmable multi-gigabit transceiver. With such a programmable transceiver, the transmit portion may be programmed in accordance with one standard while the receive section may be programmed in accordance with another standard.

Another embodiment of a programmable multi-gigabit transceiver includes a transmit section, a receive section, an interface, and a control module. The transmit section is operably coupled to convert output data words into an output serial data stream in accordance with a transmit setting. The receive section is operably coupled to convert an input serial data stream into input data words in accordance with a receive setting. The interface is operably coupled to provide the output data words from a programmable logic section to the transmit section in accordance with the transmit setting and to receive the input data words from the receive section in accordance with the receive setting and provide them to the programmable logic section. The control module is operably coupled to produce the transmit setting and the receive setting based on transceiver operational requirements. Accordingly, the transmit section and receive section may be separately programmed based on desired operational parameters.

BRIEF DESCRIPTION OF SEVERAL VIEWS OF THE DRAWINGS

FIG. 9 is a logic diagram of a method for programming a programmable multi-gigabit transceiver in accordance with the present invention;

FIG. 10 is a logic diagram of an alternate method for programming a multi-gigabit transceiver in accordance with the present invention;

FIG. 11 is a diagram illustrating the physical media attachment (PMA) mapping register in accordance with the present invention; and FIGS. 12A through 12C illustrate various programming states for the programmable multi-gigabit transceivers in accordance with the present invention.

DETAILED DESCRIPTION OF THE INVENTION

Figure 1:
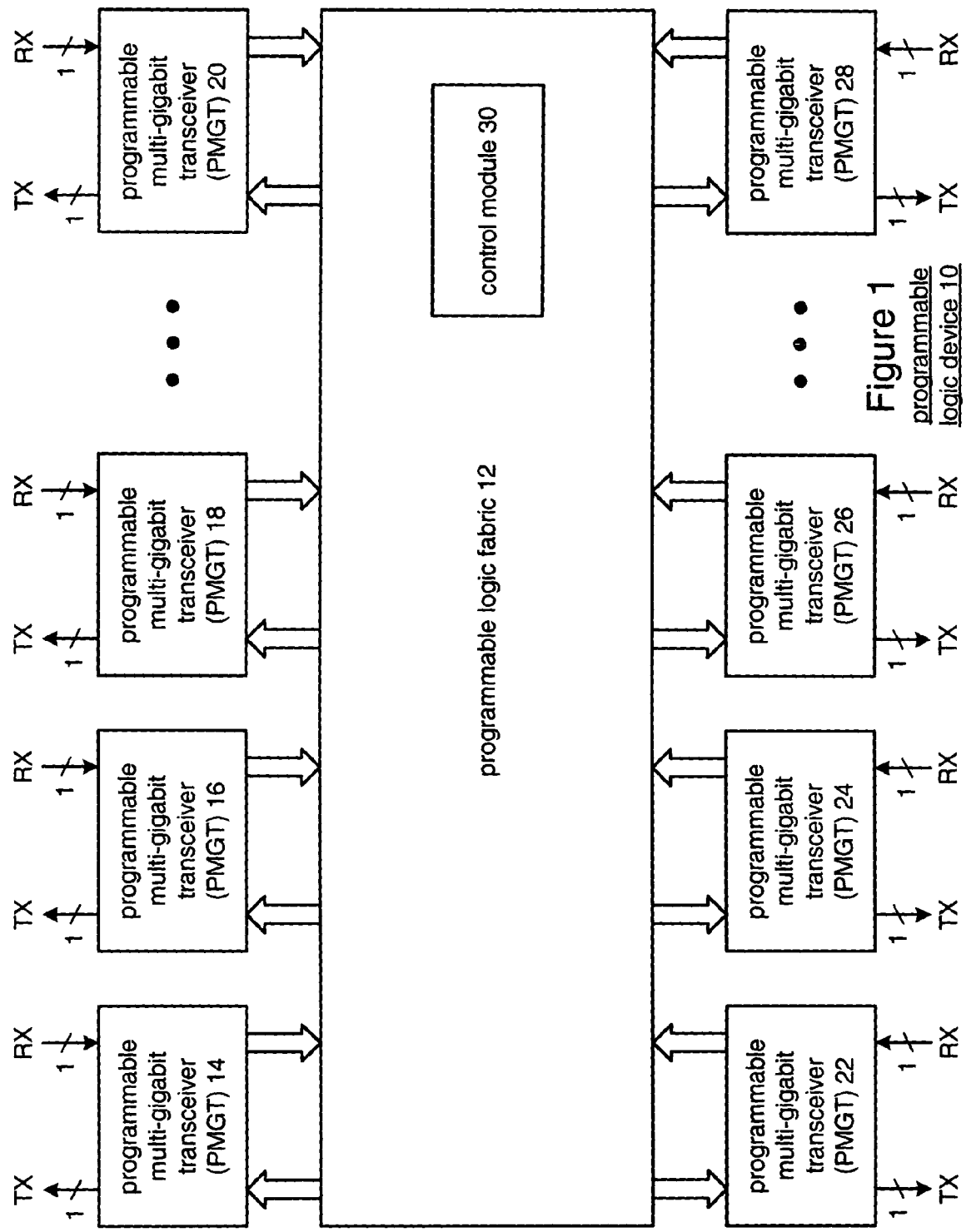
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core or digital signal processor (DSP), to further facilitate the programmable flexibility offered by a programmable logic device 10.

The control module 30 may be contained within the programmable logic fabric 12 or it may be a separate module in each of the MGTs. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14-18 may be bonded together such that the effective serial rate is 3 times 3.125 gigabits-per-second.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
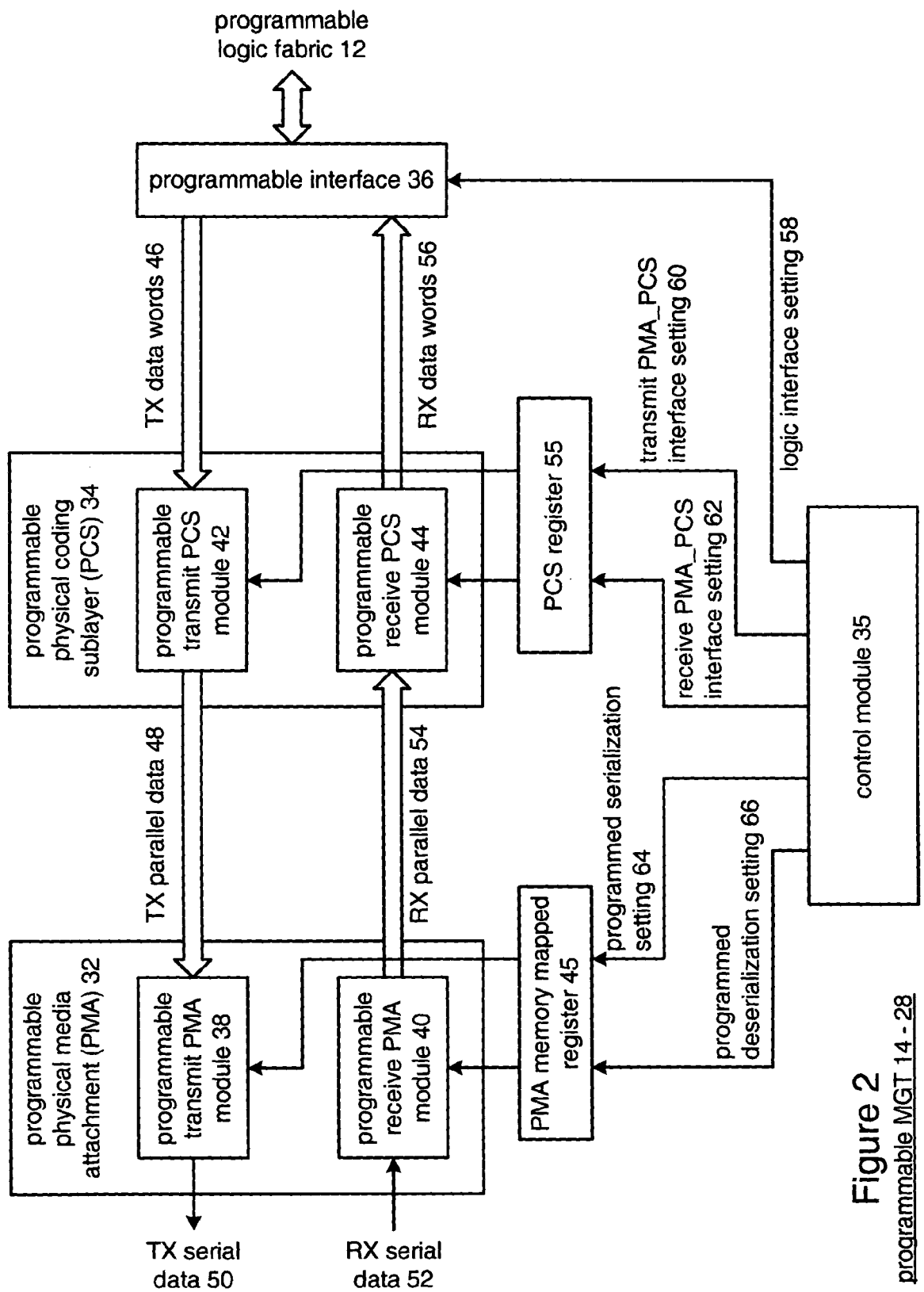
FIG. 2 is a schematic block diagram of a programmable multi-gigabit transceiver in accordance with the present invention.

FIG. 2 is a schematic block diagram of one embodiment of a representative one of the programmable multi-gigabit transceivers 14-28. As shown, the programmable multi-gigabit transceiver includes a programmable physical media attachment (PMA) module 32, a programmable physical coding sub-layer (PCS) module 34, a programmable interface 36, a control module 35, a PMA memory mapped register 45 and a PCS register 56. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers and/or included within the control module 30. In either embodiment of the PMGT control module 35, the programmable logic device control module 30 determines the corresponding overall desired operating conditions for the programmable logic device 10 and provides the corresponding operating parameters for a given multi-gigabit transceiver to its control module 35, which generates the settings 58-66 as will be described in greater detail with reference to FIGS. 9 and 10, and FIGS. 12A, 12B and 12C.

Figure 5:
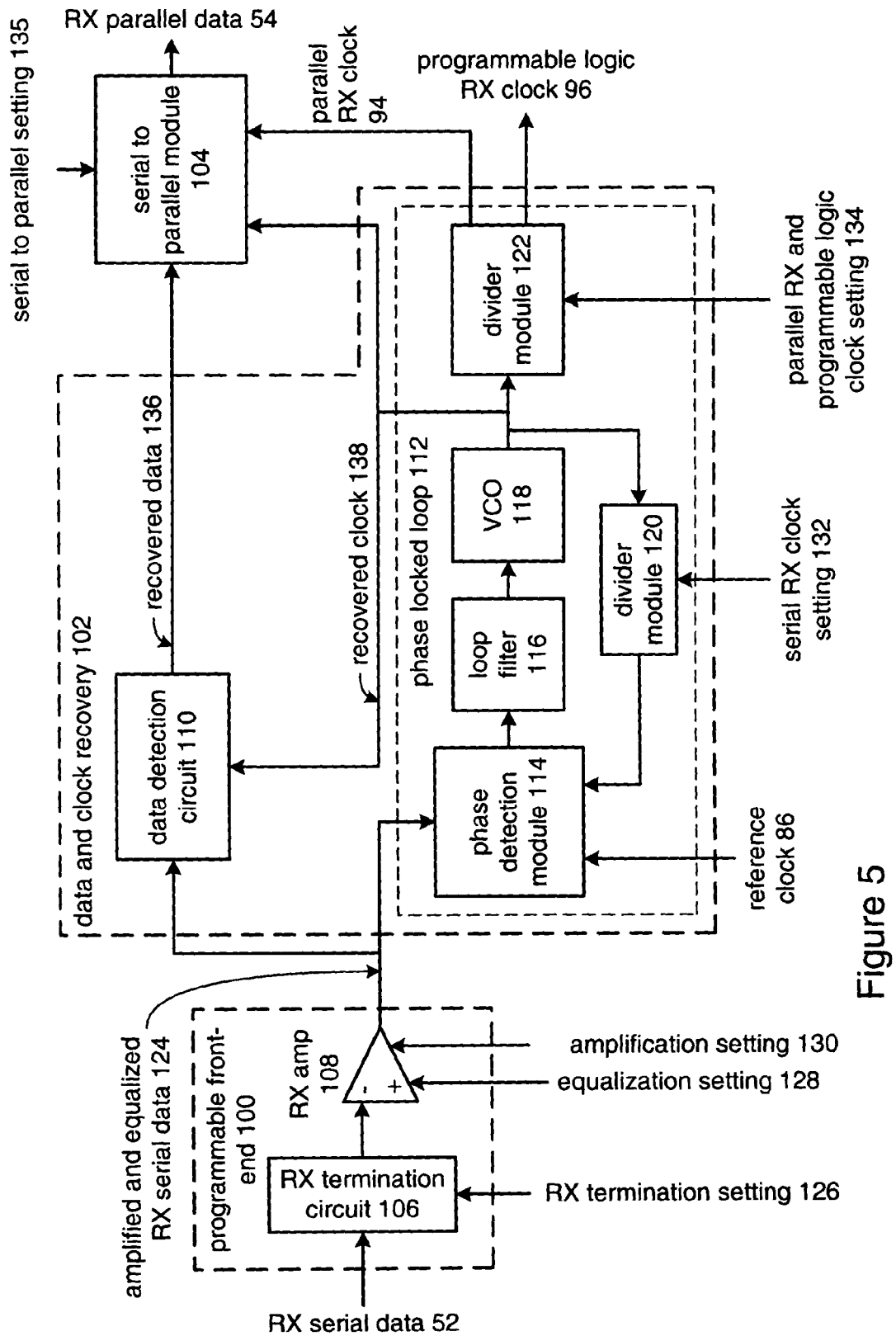
FIG. 5 is a schematic block diagram of a programmable receive physical media attachment (PMA) module in accordance with the present invention.
Figure 6:
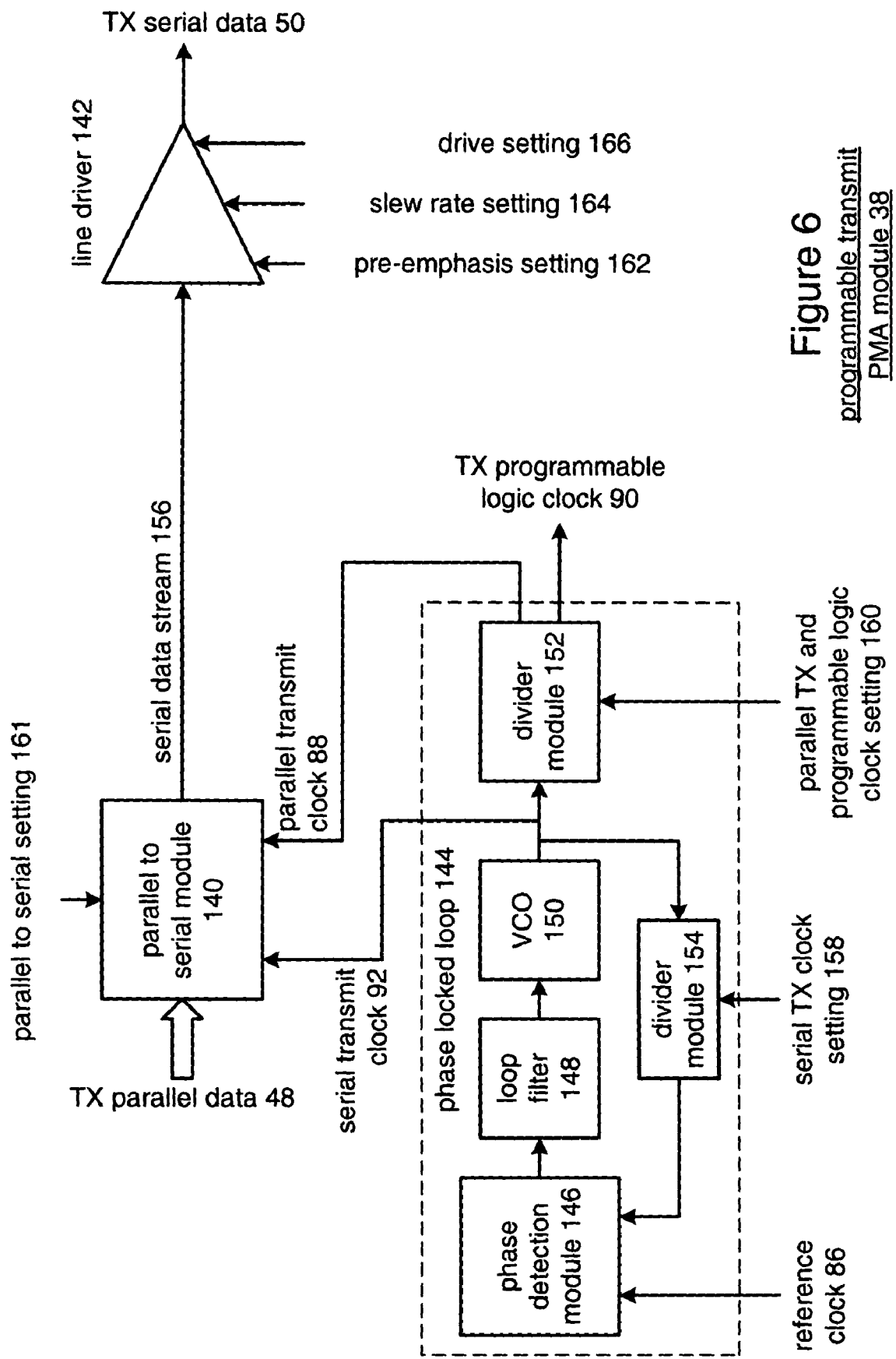
FIG. 6 is a schematic block diagram of a programmable transmit physical media attachment (PMA) module in accordance with the present invention.

The programmable physical media attachment (PMA) module 32 includes a programmable transmit PMA module 38 and a programmable receive PMA module 40. The programmable transmit PMA module 38, which will be described in greater detail in with reference to FIG. 6, is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40, which will be described in greater detail with reference to FIG. 5, is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapped register 45, which will be described in greater detail with reference to FIG. 11, may store the serialization setting 64 and the deserialization setting 66.

The programmable physical coding sub-layer (PCS) module 34 includes a programmable transmit PCS module 42 and a programmable receive PCS module 44. The programmable transmit PCS module 42, which will be described in greater detail with reference to FIG. 8, receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, et cetera) and the corresponding transmission rate of the transmit parallel data 48. The programmable receive PCS module 44, which will be described in greater detail with reference to FIG. 7, converts the received parallel data 54 into received data words 56 in accordance with the receive PMA_PCS interface setting 62. The received PMA_PCS interface setting 62 indicates the rate at which the received parallel data 54 will be received, the width of the parallel data 54, the transmit rate of the received data words 56 and the word size of the received data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the received data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard, as those indicated in FIGS. 12A-12C, such that the receive path, i.e., the programmable receive PMA module 40 and the programmable receive PCS module 44 may be programmed in accordance with one standard while the transmit path, i.e., the programmable transmit PCS module 42 and the programmable transmit PMA module 38 may be programmed in accordance with another standard.

Figure 3:
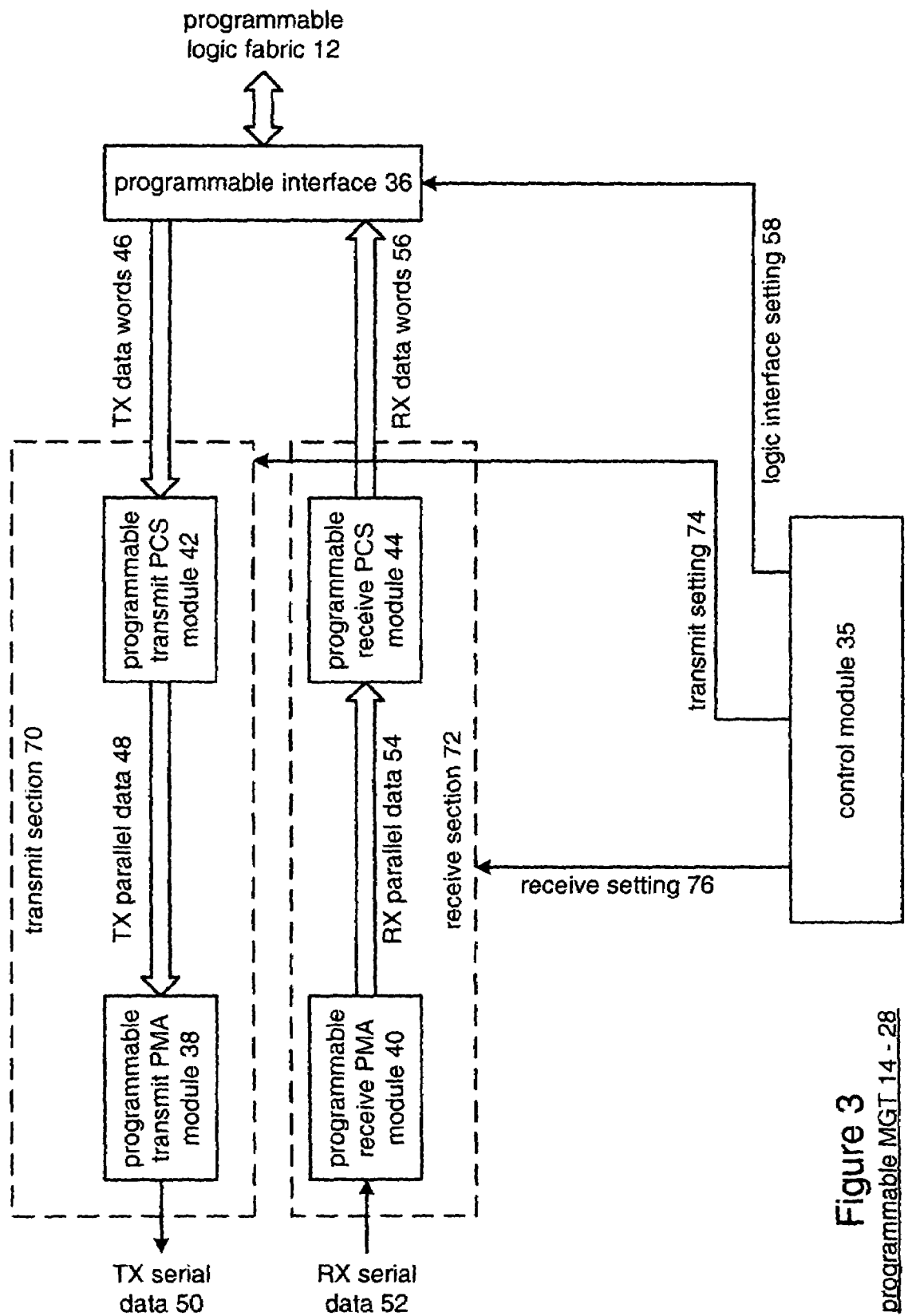
FIG. 3 is a schematic block diagram of an alternate embodiment of a programmable multi-gigabit transceiver in accordance with the present invention.

FIG. 3 illustrates an alternate schematic block diagram of a representative one of the programmable multi-gigabit transceivers 14-28. In this embodiment, the programmable multi-gigabit transceiver 14-28 includes a transmit section 70, a receive section 72, the control module 35 and the programmable interface 36. The transmit section 70 includes the programmable transmit PMA module 38 and the programmable transmit PCS module 42. The receive section 72 includes the programmable receive PMA module 40 and the programmable receive PCS module 44.

In this embodiment, the control module 35 separately programs the transmit section and the receive section via transmit setting 74 and receive setting 76, respectively. The control module 35 also programs the programmable interface 36 via the logic interface setting 58. Accordingly, the control module 35 may program the receiver section 72 to function in accordance with one standard while programming the transmit section 70 in accordance with another standard. Further, the logic interface setting 58 may indicate that the transmit data words 46 are received from the programmable logic fabric 12 at a different rate than the received data words 56 are provided to the programmable logic fabric 12. As one of average skill in the art will appreciate, the programmable interface 36 may include a transmit buffer and a receive buffer, and/or an elastic store buffer to facilitate the providing and receiving of the data words 46 and 56 to-and-from the programmable logic fabric 12.

Figure 4:
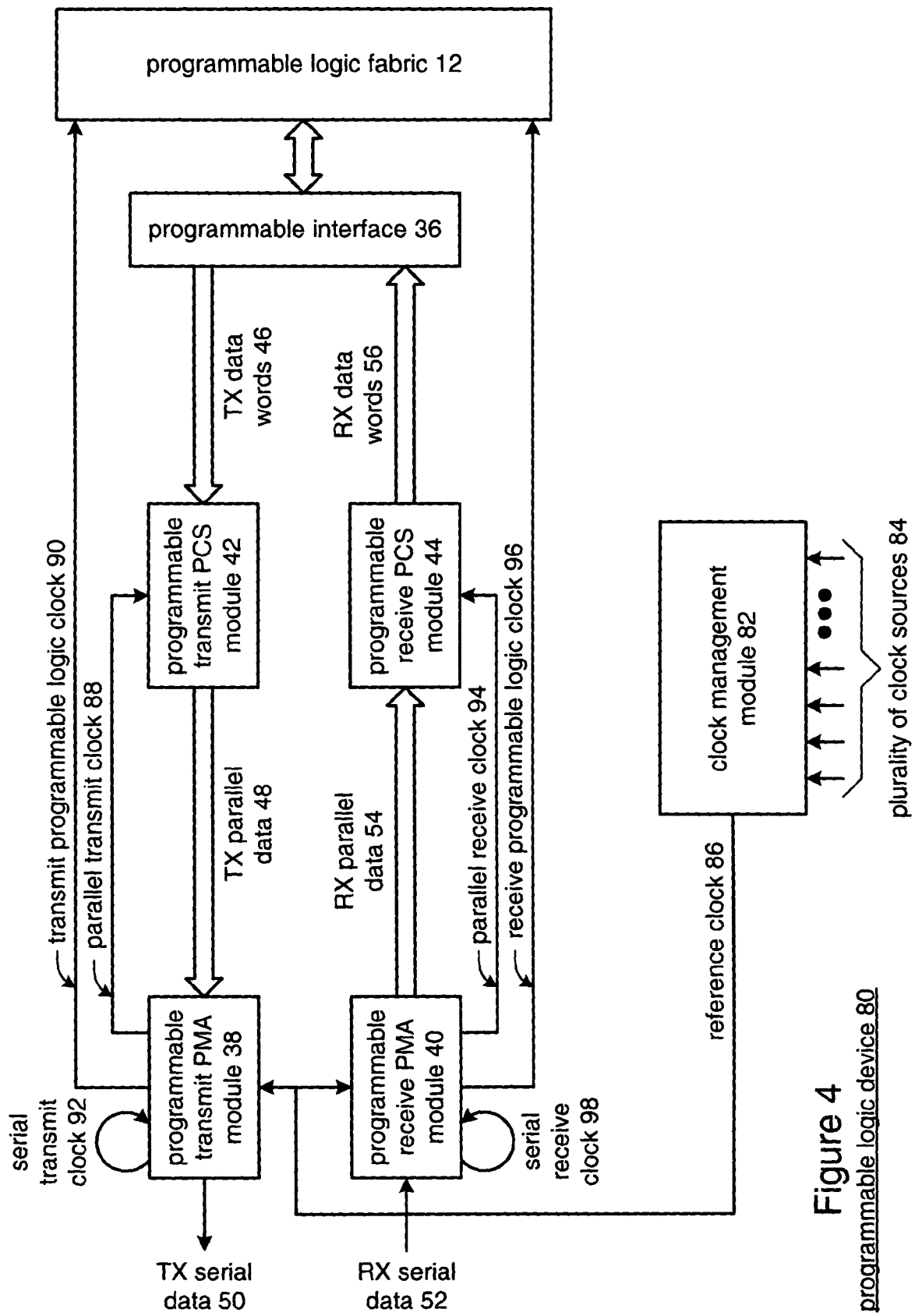
FIG. 4 is a schematic block diagram of another embodiment of a programmable logic device in accordance with the present invention.

FIG. 4 is an alternate schematic block diagram of a programmable logic device 80. The programmable logic device 80 includes the programmable transmit PMA module 38, the programmable transmit PCS module 42, the programmable interface 36, the programmable logic fabric 12, the programmable receive PCS module 44, the programmable receive PMA module 40, and a clock management module 82. The clock management module 82 receives a plurality of clock sources 84 and provides one or more of them as a reference clock 86 to the programmable transmit PMA module 38 and the programmable receive PMA module 40. The plurality of clock sources 84 includes, but is not limited to, a low jitter external clock source, a recovered clock source as may be produced by the programmable receive PMA module 40, an internal clock of the programmable logic fabric 12, and/or a system clock. While the clock management module 82 in FIG. 4 is shown to produce a single reference clock 86 that is provided to both the programmable transmit PMA module 38 and the programmable receive PMA module 40, the clock management module 82, in an alternative embodiment, may generate a separate transmit reference clock that is provided to the programmable transmit PMA module 38 and a separate receive reference clock that would be provided to the programmable receive PMA module 40.

The programmable receive PMA module 40, which will be described in greater detail with reference to FIG. 5, receives the reference clock 86 and generates therefrom a serial receive clock 98. In addition, the programmable receive PMA module 40 generates a parallel receive clock 94 and a receive programmable logic clock 96 based on the reference clock 86 and/or the serial receive clock 98. The programmable receive PMA module 40 receives the serial data 52 and, after being initialized based on the reference clock 86, recovers the serial receive clock 98 therefrom. The programmable receive PMA module 40 converts the receive serial data 52 into the receive parallel data 54 in accordance with the serial receive clock 98 and the parallel receive clock 94. The programmable receive PMA module 40 provides the parallel receive clock 94 to the programmable receive PCS module 44, which converts the receive parallel data 54 into the receive data words 56 in accordance with the parallel receive clock 94. The programmable receive PMA module 40 provides the receive programmable logic clock 96 to the programmable logic fabric 12, which processes the receive data words 56 in accordance with the receive programmable logic clock 96. Since the serial receive clock, the parallel receive clock, and the receive programmable logic clock are derived from the same reference clock, the conveyance of data between the programmable receive PMA module 40, the programmable receive PCS module 44, and the programmable logic fabric is synchronized.

Further details on the generation and use of the above clocks are described in co-pending patent application by Eric D. Groen et al. entitled MGT/FPGA CLOCK MANAGEMENT SYSTEM, having a filing date the same as the present patent application. This co-pending application is incorporated by reference, herein.

The programmable transmit PMA module 38 receives the reference clock 86 and produces therefrom a serial transmit clock 92. In addition, the programmable transmit PMA module 38 generates a transmit programmable logic clock 90 and a parallel transmit clock 88 from the serial transmit clock 92 and/or from the reference clock 86. The programmable transmit PMA module 38 provides the transmit programmable logic clock 90 to the programmable logic fabric 12, which processes data in accordance with the transmit programmable logic clock 90 to produce the transmit data words 46. The programmable transmit PMA module 38 provides the parallel transmit clock 88 to the programmable transmit PCS module 42, which converts the transmit data words 46 into the transmit parallel data 48 in accordance with the parallel transmit clock 88. The programmable transmit PMA module 38 converts the transmit parallel data 48 into the transmit serial data 50 in accordance with the serial transmit clock 92 and the transmit parallel clock 88. The programmable PMA module 38 further utilizes the serial transmit clock 92 to transmit the transmit serial data 50. Since the serial transmit clock, the parallel transmit clock, and the transmit programmable logic clock are derived from the same reference clock, the conveyance of data between the programmable transmit PMA module 38, the programmable transmit PCS module 42, and the programmable logic fabric 12 is synchronized.

As one of average skill in the art will appreciate, the programmable transmit PMA module 38, the programmable transmit PCS module 42, the programmable interface 36, the programmable receive PCS module 44 and the programmable receive PMA module 40 may be programmed as described with reference to FIGS. 2 and/or 3.

FIG. 5 illustrates a schematic block diagram of the programmable receive PMA module 40 that includes a programmable front-end 100, a data and clock recovery module 102, and a serial-to-parallel module 104. The programmable front-end 100 includes a receiver termination circuit 106 and a receiver amplifier 108. The data and clock recovery module 102 includes a data detection circuit 110 and a phase locked loop 112. The phase locked loop 112 includes a phase detection module 114, a loop filter 116, a voltage controlled oscillator 118, a $1^{st}$ divider module 120, and a $2^{nd}$ divider module 122.

The programmable front-end 100 is operably coupled to receive the receive serial data 52 and produce amplified and equalized receive serial data 124 therefrom. To achieve this, the receiver termination circuit 106 is programmed in accordance with a receive termination setting 126 to provide the appropriate termination for the transmission line between the programmable receiver PMA module 40 and the source that originally transmitted the received serial data 52. The receive termination setting 126 may indicate whether the receive serial data 52 is a single-ended signal, a differential signal, may indicate the impedance of the termination line, and may indicate the biasing of the receiver termination circuit 106. For a more detailed discussion of the receiver termination circuit 106 refer to co-pending patent application by Charles W. Boecker et al. entitled RECEIVER TERMINATION NETWORK AND APPLICATION THEREOF and having the same filing date as the present application. This co-pending application is incorporated by reference, herein.

The receiver termination circuit 106 further biases the receive serial data 52 and provides the bias adjusted signal to the receiver amplifier 108. The gain and equalization settings of the receiver amplifier 108 may be adjusted in accordance with the equalization setting 128 and the amplification setting 130, respectively. The receiver amplifier 108 may be further described in co-pending patent application by William C. Black et al. entitled ANALOG FRONT-END HAVING BUILT-IN EQUALIZATION AND APPLICATIONS THEREOF and a filing date the same as the present patent application. This co-pending application is incorporated by reference, herein. Note that the receiver termination setting 126, the equalization setting 128, and the amplification setting 130 are part of the program deserialization setting 66 provided by the control module 35.

The data and clock recovery circuit 102 receives the amplified and equalized receive serial data 124 via the phase detection module 114 of phase locked loop 112 and via the data detection circuit 110. The phase detection module 114 has been initialized prior to receiving the amplified and equalized receive serial data 124 by comparing the phase and/or frequency of the reference clock 86 with a feedback reference clock produced by divider module 120. Based on this phase and/or frequency difference, the phase detection module 114 produces a corresponding current that is provided to loop filter 116. The loop filter 116 converts the current into a control voltage that adjusts the output frequency of the voltage controlled oscillator 118. The divider module 120, based on a serial received clock setting 132 or settings within the bit stream, divides the output oscillation produced by the VCO 118 to produce the feedback signal. Once the amplified and equalized receive serial data is received, the phase detection module 114 compares the phase of the amplified and equalized receive serial data 124 with the phase of the amplified and equalized receive serial data 124. Based on a phase difference between the amplified and equalized receive serial data 124 and the feedback signal, a current signal is produced.

The phase detection module 114 provides the current signal to the loop filter 116, which converts it into a control voltage that controls the output frequency of the voltage controlled oscillator 118. At this point, the output of the voltage controlled oscillator 118 corresponds to a recovered clock 138. The recovered clock 138, which was referenced as the serial receive clock 98 in FIG. 4, is provided to the divider module 122, the data detection circuit 110 and to the serial-to-parallel module 104. The data detection module 110 utilizes the recovered clock 138 to recover data 136 from the amplified equalized receive serial data 124. The divider module 122 divides the recovered clock 138, in accordance with a parallel receive and programmable logic clock setting 134, to produce the parallel receive clock 94 and the programmable logic receive clock 96. Note that the serial receive clock setting 132 and the parallel receive and programmable logic clock setting 134 are part of the programmable deserialization setting 66 provided to the programmable receive PMA module 40 by the control module 35.

The serial-to-parallel module 104, which may include an elastic store buffer, receives the recovered data 136 at a serial rate in accordance with the recovered clock 138. Based on a serial-to-parallel setting 135 and the parallel receive clock 194, the serial-to-parallel module 104 outputs the receive parallel data 54. The serial-to-parallel setting 135, which may be part of the programmable deserialization setting 66, indicates the rate and data width of the receive parallel data 54.

FIG. 6 illustrates a schematic block diagram of a programmable transmit PMA module 38 that includes a phase locked loop 144, a parallel-to-serial module 140, and line driver 142. The phase locked loop 144 includes a phase detection module 146, a loop filter 148, a voltage control oscillator 150, a divider module 154, and a divider module 152.

The phase detection module 146 compares the phase and/or frequency of the reference clock 86 with the phase and/or frequency of a feedback oscillation produced by divider module 154. The phase detection module 146 generates a current signal to represent the phase and/or frequency difference between the reference clock 86 and the feedback oscillation. The loop filter 148 converts the current signal into a control voltage that regulates the output oscillation produced by the voltage control oscillator 150. Divider module 154, based on a serial transmit clock setting 158, divides the output oscillation of the VCO 150, which corresponds to the serial transmit clock 92, to produce the feedback oscillation. Note that the serial transmit clock setting 158 may be part of the programmed serialization setting 64 provided to the programmable transmit PMA module 38 by the control module 35. An embodiment of the VCO ISO is found in METHOD AND CIRCUIT FOR REDUCING VCO NOISE, by Eric D. Groen et al., and having the same filing date as the present application. This co-pending application is incorporated by reference, herein.

Divider module 152 receives the serial transmit clock 92 and, based on a parallel transmit and programmable logic clock setting 160, produces the parallel transmit clock 88 and the transmit programmable logic clock 90. The parallel transmit and programmable logic clock setting 160 may be part of the programmed serialization setting 64.

The parallel-to-serial module 140 receives the transmit parallel data 48 and produces therefrom a serial data stream 156. To facilitate the parallel-to-serial conversion, the parallel-to-serial module 140, which may include an elastic stored buffer, receives a parallel-to-serial setting 161 to indicate the width of the transmit parallel data 48 and the rate of the transmit parallel data, which corresponds to the parallel transmit clock 88. Based on setting 161, the serial transmit clock 92 and the parallel transmit clock 88, the parallel-to-serial module 140 produces the serial data stream 156 from the transmit parallel data 48.

The line driver 142 increases the power of the serial transmit data 156 to produce the transmit serial data 50. The line driver 142 may be programmed to adjust its pre-emphasis settings, slew rate settings, and drive settings via a pre-emphasis setting signal 162, a slew rate setting signal 164 and a drive setting signal 166. The pre-emphasis setting 162, slew rate setting 164 and drive setting 166 may be part of the programmed serialization setting 64. As one of average skill in the art will appreciate, while the diagram of FIG. 6 is shown as a single-ended system, the entire system may be differential signaling and/or a combination of differential and single-ended signaling. Further details on the line driver 142 are described in co-pending patent application by Eric D. Groen et al. entitled DAC BASED DRIVER WITH SELECTABLE PRE-EMPHASIS SIGNAL LEVELS and having a filing date the same as the present patent application and in co-pending patent application by Eric D. Groen entitled TX LINE DRIVER WITH COMMON MODE IDLE STATE AND SELECTABLE SLEW RATES and having a filing date the same as the present patent application. These co-pending applications are incorporated by reference, herein.

Figure 7:
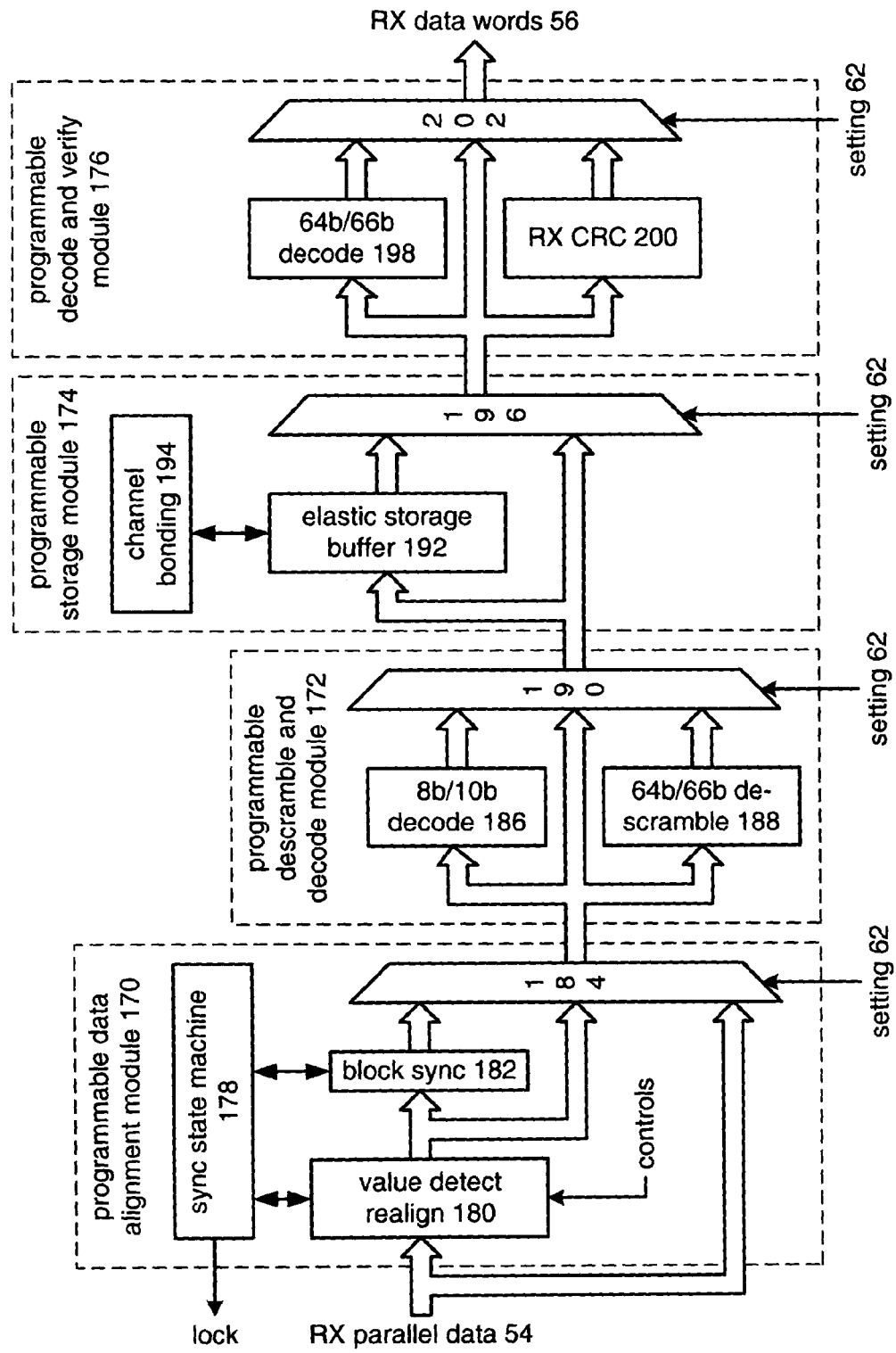
FIG. 7 is a schematic block diagram of a programmable receive physical coding sub-layer (PCS) module in accordance with the present invention.

FIG. 7 is a schematic block diagram of a programmable receive PCS module 44 that includes a programmable data alignment module 170, a programmable descramble and decode module 172, a programmable storage module 174, and a programmable decode and verify module 176. The programmable data alignment module 170 includes a synchronous state machine 178, a value detect realign module 180, a block synchronization module 182, and a multiplexer 184. The programmable descramble and decode module 172 includes a 64b/66b descrambling module 188, an 8b/10b decoding module 186 and a multiplexer 190. The programmable storage module 174 includes a channel bonding module 194, an elastic storage buffer 192 and a multiplexer 196. The programmable decode and verify module 176 includes a receiver CRC (cycle redundancy check) module 200, a 64b/66b decoding module 198, and a multiplexer 202.

In operation, the programmable data alignment module 170 receives the receive parallel data 54. Based on the receive PMA_PCS interface setting 62, the receive parallel data 54 may be passed via multiplexer 184 without processing, may be processed by the value detect realign module 180 and then passed via multiplexer 184 and/or further processed via the block synchronization module 182. As such, the setting 62 may bypass the programmable data align module 170, perform a value detection realignment and pass the realigned data and/or further utilize block synchronization, which is typically used for 10 gigabits-per-second signaling. The synchronization state machine 178 coordinates the alignment of the receive parallel data 54 via the value detect realign 180 and the block synchronization module 182. In addition, once the value detect realignment module 180 indicates that the data is valid and the block synchronization module 182 indicates that the PCS module is now in sync with the receive parallel data 54, the sync state machine 178 generates a lock signal.

The controls of the value detect realign module 180 include receiver polarity of the signal, alignment information, et cetera.

The programmable descramble and decode module 172 receives the output of multiplexer 184 and, based on setting 62, either passes the data via multiplexer 190 descrambles it via the 64b/66b descrambler 188 or decodes it via the 8b/10b decode module 186. The 64b/66b descrambling module 188 is described in greater detail in co-pending patent application by Joseph N. Kryzak et al. entitled FRAMING OF TRANSMIT ENCODED DATA AND LINEAR FEEDBACK SHIFTING and having a filing date the same as the present application. This co-pending application is incorporated by reference, herein. The 8b/10b decoding module 186 is further described in co-pending patent application by Joseph N. Kryzak et al. entitled ENHANCED 8B/10B ENCODING/DECODING AND APPLICATIONS THEREOF and having the same filing date as the present application. This co-pending application is incorporated by reference, herein.

The programmable storage module 174 may buffer the data it receives from multiplexer 190 via the elastic store buffer 192 to facilitate channel bonding or pass the data directly to multiplexer 196. The channel bonding module 194 enables the receiver of one programmable multi-gigabit transceiver to be linked or bonded with another receiver within another multi-gigabit transceiver to increase the effective serial data rate. The programmable storage module 174 is further described in co-pending patent application by Joseph N. Kryzak et al. entitled CHANNEL BONDING & CLOCK CORRECTION, WITH SYNC HEADERS, 64B/66B, MASTER SLAVE COMMUNICATIONS AND MASKING OF CBCC SEQUENCES and having the same filing date as the present application. This co-pending application is incorporated by reference, herein.

The programmable decode and verify module 176 receives the output of multiplexer 196 and passes it directly as the receive data word 56 in accordance with setting 62, processes the data via a receive CRC module 200 and provides that as the output, or decodes it via the 64b/66b decoding module 198. The 64b/66b decode module 198 is described in greater detail in co-pending patent application by Joseph N. Kryzak et al. entitled FRAMING OF TRANSMIT ENCODED DATA AND LINEAR FEEDBACK SHIFTING and having a filing date the same as the present application.

As one of average skill in the art will appreciate, the programmable receive PCS module 44 is readily programmable via settings 62 to decode the received parallel data 54 using a variety of decoding schemes, to process channel bonding, to verify and lock the incoming data, et cetera.

Figure 8:
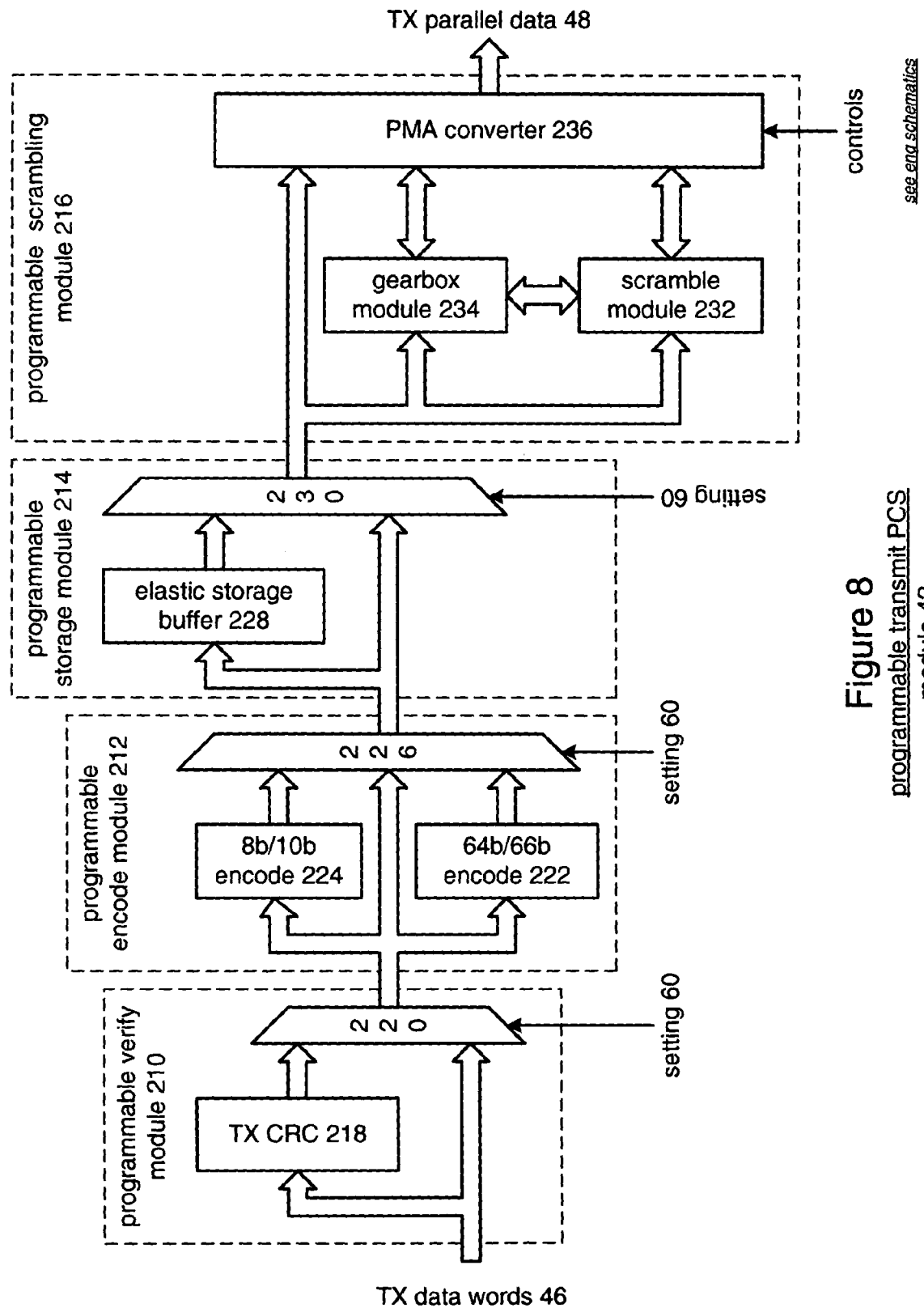
FIG. 8 is a schematic block diagram of a programmable transmit physical coding sub-layer (PCS) module in accordance with the present invention.

FIG. 8 is a schematic block diagram of the programmable transmit PCS module 42 that includes a programmable verify module 210, a programmable encode module 212, a programmable storage module 214, and a programmable scramble module 216. The programmable verify module 210 includes a transmit CRC module 218 and a multiplexer 220. The programmable encode module 212 includes a 64b/66b encoding module 222, an 8b/10b encoding module 224, and a multiplexer 226. The programmable storage module 214 includes an elastic storage buffer 228 and a multiplexer 230. The programmable scramble module 216 includes a scramble module 232, a gearbox module 234, and a PMA converter 236.

The programmable verify module 210 is operably coupled to receive the transmit data words 46 and either pass them directly to the programmable encoding module 212 or perform a cycle redundancy check upon them. The transmit PMA_PCS interface setting 60 indicates whether the transmit data words 46 will be directly passed to the programmable encode module 212 or be subject to a cycle redundancy check. The programmable encoding module 212, based on setting 60, either encodes the data received from the programmable verify module 210 via the 8b/10b encoder 224, the 64b/66b encoder 222 or passes the data directly to the programmable storage module 214. The 64b/66b encoder 222 is described in greater detail with reference to co-pending patent application by Joseph N. Kryzak et al. entitled FRAMING OF TRANSMIT ENCODED DATA AND LINEAR FEEDBACK SHIFTING and having a filing date the same as the present application. The 8b/10b encoder 224 is more fully described in co-pending patent application by Charles W. Boecker et al. entitled ENHANCED 8B/10B ENCODING/DECODING AND APPLICATIONS THEREOF and having the same filing date as the present application. This co-pending application is incorporated by reference, herein.

The programmable storage module 214, based on setting 60, either passes the data that it receives from the programmable encode module 212 or stores it in the elastic storage buffer 228. The elastic storage buffer 228 allows for differing time rates between the transmit data words 46 and the transmit parallel data 48. For example, if the transmit data words 46 are 1-byte words at a rate of 500 megahertz and the transmit parallel data 48 is 2-bytes width at 300 megahertz, the data-per-cycle rate is different between the transmit data words 46 and the transmit parallel data 48. Accordingly, the elastic storage buffer 228 allows for data to accumulate in the elastic storage buffer and thus accommodate the differing data-per-rate discrepancies between the transmit data word 46 and the transmit parallel data 48.

The programmable scramble module 216 receives the output of multiplexer 230 and either passes it directly to the PMA converter 236 to produce the transmit parallel data 48 based on control signals or scrambles the data via the scramble module 232 and the gearbox module 234. The controls for the PMA converter 236 include polarity of the parallel data 48 and an indication of which path the data will be received from. The scramble module 232 and gearbox module 234 are further described in co-pending patent application by Joseph N. Kryzak et al. entitled FRAMING OF TRANSMIT ENCODED DATA AND LINEAR FEEDBACK SHIFTING and having the same filing date as the present application.

As one of average skill in the art will appreciate, the programmable transmit PCS module 42 may be programmed in a variety of ways to directly pass the transmit data words 46, encode them, scramble them, buffer them, et cetera. As such, with a wide diversity in programming abilities, the programmable transmit PCS module 42 as well as the entire programmable multi-gigabit transceiver may be programmed in accordance with many standards.

FIG. 9 illustrates a logic diagram of a method for establishing the settings for the programmable multi-gigabit transceivers. Such a method may be performed by the control module 30 and/or control module 35. The process begins at Step 240 where a programming setting that indicates the desired mode-of-operation for the programmable multi-gigabit transceiver (PMGT) is received. The primitive may be received based on a user selection and/or based on an auto configuration process. Such an auto configuration process would sense the environment in which the PMGT is located to determine its operating mode. A primitive, which will be described in greater detail in FIGS. 12A-12C, generally indicates a particular application of a corresponding standard. For example, with reference to FIG. 12A, the primitive GT10_10GFC_8 corresponds to the 10-gig fiber-channel standard that provides a serial transmission rate of 10.51875 gigabits-per-second, utilizes 64b/66b encoding and has a fabric interface of 64-bits data words at 159.37 megahertz.

Returning to the discussion of FIG. 9, the process continues at Step 242 where the programming setting is converted into the programmed serialization setting, the programmed deserialization setting, the receive PMA_PCS interface setting, the transmit PMA_PCS interface setting and the logic interface setting. As previously mentioned, the primitive indicates the particular application of a standard. As such, the primitive will indicate the serial transmission rate, the corresponding encoding and the fabric interface rate. Accordingly, based on these values, the settings, which program the PMGT are established.

The process then proceeds to Step 244 where the programmed serialization setting and the programmed deserialization setting are provided to the PMA memory mapped register. The PMA memory mapped register will be further described with reference to FIG. 11. The process then proceeds to Step 246 where the transmit and receive PMA_PCS interface settings and the programmable logic interface settings are provided to the PCS register. Once the settings are stored in the appropriate registers, the PMA sections of the PMGT and the PCS sections of the PMGT are correspondingly programmed as described in FIGS. 5-8.

FIG. 10 is a logic diagram of a method that further indicates the programming of the programmable MGT by control module 30 and/or control module 35. The process begins at Step 250 where the programmed serialization setting is generated to enable, logically disable and/or physically disable at least one element of the programmable PMA receiver module. For example, with reference to FIG. 5, the programmed serialization setting 66 may be used to enable and/or disable the programmable front-end 100, the phase locked loop 112, the data detection circuit 110 and/or the serial-to-parallel module 104. The elements to be disabled are based on the particular mode-of-operation. If data is not being received, the entire programmable received PMA module may be disabled thus conserving power.

Returning to the discussion of FIG. 10, the process proceeds to Step 252 where the programmed deserialization setting is generated to enable, logically disable or physically disable at least one element of the programmable PMA transmitter module. For example, with reference to FIG. 6, the programmed serialization setting 64 may enable or disable physically (i.e., remove power therefrom) or logically disable (i.e., logically hold an input or output to a known state) the phase locked loop 144, the parallel-to-serial module 140, and/or the line-driver 142.

Returning to the discussion of FIG. 10, the process then proceeds to Step 254 where the transmit PMA_PCS interface setting is generated to enable, logically disable and/or physically disable at least one element of the programmable PCS transmit module. The process then proceeds to Step 256 where the received PMA_PCS interface setting is generated to enable, logically disable and/or physically disable at least one element of the programmable PCS received module. The elements of the programmable PCS transmit module are shown in FIG. 8 and the elements of the programmable receive PCS module are shown in FIG. 7.

FIG. 11 illustrates the contents of the PMA mapping register 45. As shown, the mapping register includes memory spaces for indicating a variety of operations for the PMA module including a master bias, transmit divider ratio, transmit loop filter settings, transmit mode control, transmit output level, transmit output mode, receive divider ratio, receive loop filter settings, received mode of operation, received forward error encoding and power control of the PMA module.

FIGS. 12A-12C illustrate a plurality of primitives, their corresponding standards, serial rate, encoding scheme and fabric interface rate. Accordingly, any of these primitives, or programming settings, may be selected by a user of the device and the corresponding settings derived to program the programmable logic device to support the particular standard.

The preceding discussion has presented a programmable logic device that includes programmable multi-gigabit transceivers. The multi-gigabit transceivers have separately programmable transmit paths and receive paths and may be independently programmed from one another within the programmable logic device. As such, a great deal of flexibility is provided via such a programmable logic device. As one of average skill in the art will appreciate, other embodiments may be derived from the teaching of the present invention without deviating from the scope of the claims.

What is claimed is:

1. A programmable multi-gigabit transceiver comprises:
    programmable physical media attachment (PMA) module operably coupled to convert transmit parallel data into transmit serial data in accordance with a programmed serialization setting and to convert receive serial data into receive parallel data in accordance with a programmed deserialization selling;
    programmable physical coding sublayer (PCS) module operably coupled to convert transmit data words into the transmit parallel data in accordance with a transmit interface setting and to convert the receive parallel data into receive data words in accordance with a receive interface setting, the PCS module comprising:
        a programmable PCS receive module operably coupled to convert the receive parallel data into receive data words in accordance with the receive interface setting, the receive module comprising:
            a programmable data alignment module operably coupled to align the receive parallel data in accordance with the receive interface setting to produce aligned data words, wherein size and rate of the aligned data words are set based on the receive interface setting;
            a programmable descramble and decode module operably coupled to descramble, decode, or pass the aligned data words in accordance with the receive interface setting to produce processed aligned data words, wherein the receive interface setting indicates descrambling, decoding, or passing of the aligned data words, wherein the receive interface setting further indicates a type of descrambling when the programmable descramble and decode module is descrambling the aligned data words and further indicates a type of decoding when the programmable descramble and decode module is decoding the aligned data words;
            a programmable storage module operably coupled to elastic store or pass the processed data words in accordance with the receive interface setting to produce stored data words; and a programmable decode and verify module operably coupled to decode, verify or pass the stored data words in accordance with the receive interface setting and the programmed logic interface setting to produce the receive data words, wherein the receive interface setting indicates the decoding, the verifying or the passing of the stored data words, indicates a second type of decoding when the programmable decode and verify module is decoding the stored data words and indicates a type of verifying when the programmable decode and verify module is verifying the stored data words and wherein the programmed logic interface setting indicates rate and size of the received data words;

programmable interface operably to convey the receive data words from the programmable PCS module to a programmable logic fabric section and to convey the transmit data words from the programmable logic fabric section to the programmable PCS module in accordance with a programmed logic interface setting; and control module operably coupled to generate the programmed serialization setting, the programmed deserialization setting, the receive interface setting, the transmit interface setting, and the logic interface setting based on a desired mode of operation for the programmable multi-gigabit transceiver.

2. The programmable multi-gigabit transceiver of claim 1, wherein the programmable PMA further comprises:

a programmable PMA receiver module operably coupled to deserialize the receive serial data in accordance with the programmed deserialization selling to produce the receive parallel data; and a programmable PMA transmitter module operably coupled to serialize the transmit parallel data in accordance with a programmed serialization setting to produce the transmit serial data.

3. The programmable multi-gigabit transceiver of claim 2, wherein the programmable PMA receiver module further comprises:

programmable analog front-end operably coupled to amplify and equalize the receive serial data to produce amplified and equalized receive serial data, wherein amplification and equalization performed by the programmable analog front-end are set in accordance with the programmed deserialization setting;

data and clock recovery module operably coupled to recover data and a clock from the amplified and equalized receive serial data to produce recovered data and a recovered clock, respectively, wherein the data and clock recovery module includes a programmable phase locked loop that is programmed in accordance with the programmed deserialization setting; and serial-to-parallel module operably coupled to convert the recovered data into the receive parallel data, wherein rate of the receive parallel data and width of the receive parallel data are set in accordance with the programmed deserialization setting.

4. The programmable multi-gigabit transceiver of claim 2, wherein the programmable PMA transmitter module further comprises:

phase locked loop operably coupled to produce timing signals in accordance with the programmed serialization selling;

parallel-to-serial module operably coupled to convert the transmit parallel data into the transmit serial data based on the timing signals, wherein data width of the transmit parallel data and rate of the transmit serial data are set in accordance with the programmed serialization setting; and driver operably coupled to drive the transmit serial data on to a transmission line, wherein drive level of the driver and pre-emphasis settings of the driver is set in accordance with the programmed serialization setting.

5. The programmable multi-gigabit transceiver of claim 1, wherein the programmable PCS module further comprises:

a programmable PCS transmit module operably coupled to convert the transmit data words into the transmit parallel data in accordance with the transmit interface setting.

6. The programmable multi-gigabit transceiver of claim 5, wherein the programmable PCS transmit module further comprises:

programmable verify module operably coupled to verify or pass the transmit data words in accordance with the transmit interface setting and the programmed logic interface setting to produce verified transmit data words and wherein the programmed logic interface setting indicates size and rate of the transmit data words;

programmable encoding module operably coupled to encode or pass the verified transmit data words in accordance with the transmit interface setting to produce encoded data words, wherein the transmit interface setting indicates a type of encoding when the programmable encoding module is encoding the verified transmit data words;

programmable storage module operably coupled to elastic store or pass the encoded data words in accordance with the transmit interface setting to produce stored encoded data words; and programmable scrambling module operably coupled to scramble or pass the stored encoded data words in accordance with the transmit interface setting to produce the transmit parallel data, wherein the transmit interface setting indicates a type of scrambling when the programmable scrambling module is scrambling the stored encoded data words.

7. The programmable multi-gigabit transceiver of claim 1 further comprises:

a PMA memory mapped register operable to store element settings for elements of the PMA module as indicated by the programmed serialization setting and the programmed deserialization setting; and PCS register operable to store element settings for elements of the PCS module as indicated by the transmit and receive interface settings and the programmed logic interface setting.

8. The programmable multi-gigabit transceiver of claim 7, wherein the control module further functions to:

receive a programming setting that indicates the desired mode of operation for the programmable multi-gigabit transceiver;

convert the programming setting into the programmed serialization setting, the programmed deserialization setting, the receive interface setting, the transmit interface setting, and the logic interface setting;

provide the programmed serialization setting and the programmed deserialization setting to the PMA memory mapped register; and provide the transmit and receive interface settings and the programmed logic interface setting to the PCS register.

9. The programmable multi-gigabit transceiver of claim 7, wherein the control module further functions to:

determine a programming setting that indicates the desired mode of operation for the programmable multi-gigabit transceiver based on auto-configuration information;

convert the programming setting into the programmed serialization setting, the programmed deserialization setting, the receive interface setting, the transmit interface setting, and the logic interface setting;

provide the programmed serialization setting and the programmed deserialization setting to the PMA memory mapped register; and provide the transmit and receive interface settings and the programmed logic interface setting to the PCS register.

10. The programmable multi-gigabit transceiver of claim 1, wherein the control module further functions to:

generate the programmed serialization setting to enable, logically disable, or physically disable at least one element of a programmable PMA receiver module of the programmable PMA module;

generate the programmed deserialization setting to enable, logically disable, or physically disable at least one element of a programmable PMA transmit module of the programmable PMA module;

generate the transmit interface setting to enable, logically disable, or physically disable at least one element of a programmable PCS transmit module of the programmable PCS module; and generate the receive interface setting to enable, logically disable, or physically disable at least one element of a programmable PCS receive module of the programmable PCS module.

11. A programmable logic device comprises:

clock management module operably coupled to provide a reference clock from one of a plurality of clock sources;

transmit physical media attachment (PMA) module operably coupled to convert parallel transmit data into serial transmit data, wherein the transmit PMA module receives the parallel transmit data in accordance with a parallel transmit clock and transmits the serial transmit data in accordance with a serial transmit clock, wherein the transmit PMA module generates the parallel transmit clock, the serial transmit clock, and a transmit programmable logic clock based on the reference clock;

receive PMA module operably coupled to convert serial receive data into parallel receive data, wherein the receive PMA module receives the serial receive data in accordance with a serial receive clock and provides the parallel receive data in accordance with a parallel receive clock, wherein the receive PMA module generates the serial receive clock, the parallel receive clock, and a receive programmable logic clock based on the reference clock;

transmit physical coding sublayer (PCS) module operably coupled to convert transmit data words into the parallel transmit data in accordance with the parallel transmit clock;

receive PCS module operably coupled to convert the parallel receive data into receive data words in accordance with the parallel receive clock;

programmable logic fabric operably coupled to produce the transmit data words in accordance with the transmit programmable logic clock and to process the received data words in accordance with the receive programmable logic clock;

wherein the plurality of clock source further comprises a low jitter external clock source, a recovered clock, and internal clock of the programmable logic fabric; and wherein the receive PCS module further comprises:

programmable data alignment module operably coupled to align data words of the parallel receive data in accordance with a receive interface setting and the parallel transmit clock to produce aligned data words wherein size and rate of the aligned data words are set based on the receive interface setting;

programmable descramble and decode module operably coupled to descramble, decode, or pass the aligned data words in accordance with the receive interface setting to produce processed aligned data words, wherein the receive interface setting indicates descrambling, decoding, or passing of the aligned data words, wherein the receive interface setting further indicates a type of descrambling when the programmable descramble and decode module is descrambling the aligned data words and further indicates a type of decoding when the programmable descramble and decode module is decoding the aligned data words;

programmable storage module operably coupled to elastic store or pass the processed data words in accordance with the receive interface setting to produce stored data words; and programmable decode and verify module operably coupled to decode, verify or pass the stored data words in accordance with the receive interface setting and a programmed logic interface setting to produce the receive data words, wherein the receive interface setting indicates the decoding, the verifying or the passing of the stored data words, indicates a second type of decoding when the programmable decode and verify module is decoding the stored data words and indicates a type of verifying when the programmable decode and verify module is verifying the stored data words and wherein the programmed logic interface setting indicates rate and size of the received data words.

12. The programmable logic device of claim 11, wherein the reference clock further comprises:

a transmit reference clock that is provided to the transmit PMA module, wherein the transmit PMA module generates the serial transmit clock and the parallel transmit clock based on the transmit reference clock; and a receive reference clock that is provided to the receive PMA module, wherein the receive PMA module generates the serial receive clock and the parallel receive clock based on the receive reference clock.

13. The programmable logic device of claim 11, wherein the receive PMA module further comprises:

programmable analog front-end operably coupled to amplify and equalize the serial receive data to produce amplified and equalized serial receive data, wherein amplification and equalization performed by the programmable analog front-end are set in accordance with a programmed deserialization setting;

data and clock recovery module operably coupled to recover data and a clock from the amplified and equalized serial receive data to produce recovered data and a recovered clock, respectively, wherein the data and clock recovery module includes a programmable phase locked loop that is programmed in accordance with the programmed deserialization setting, wherein the phase locked loop generates the serial receive clock, parallel receive clock, and the receive programmable logic clock based on the recovered clock and the reference clock; and serial-to-parallel module operably coupled to convert the recovered data into the parallel receive data, wherein rate of the parallel receive data and width of the parallel receive data are set in accordance with the programmed deserialization setting.

14. The programmable logic device of claim 11, wherein the transmit PMA module further comprises:
phase locked loop operably coupled to produce the serial transmit clock, the parallel transmit clock, and the transmit programmable logic clock based on the reference clock in accordance with a programmed serialization setting;
parallel-to-serial module operably coupled to convert the parallel transmit data into a serial data stream based on the serial transmit clock and the parallel transmit clock, wherein data width of the parallel transmit data and rate of the serial data stream are set in accordance with the programmed serialization setting; and
driver operably coupled to drive the serial data stream on to a transmission line as the serial transmit data, wherein drive level of the driver and pre-emphasis settings of the driver is set in accordance with the programmed serialization setting.

15. The programmable logic device of claim 11, wherein the transmit PCS module further comprises:
programmable verify module operably coupled to verity or pass the transmit data words in accordance with a transmit interface setting and a programmed logic interface setting to produce verified transmit data words and wherein the programmed logic interface setting indicates size and rate of the transmit data words;
programmable encoding module operably coupled to encode or pass the verified transmit data words in accordance with the transmit interface setting to produce encoded data words, wherein the transmit interface setting indicates a type of encoding when the programmable encoding module is encoding the verified transmit data words;
programmable storage module operably coupled to elastic store or pass the encoded data words in accordance with the transmit interface setting to produce stored encoded data words; and
programmable scrambling module operably coupled to scramble or pass the stored encoded data words in accordance with the transmit interface setting to produce the parallel transmit data, wherein the transmit interface setting indicates a type of scrambling when the programmable scrambling module is scrambling the stored encoded data words.

16. A programmable multi-gigabit transceiver comprises:
a transmit section operably coupled to convert transmit data words into transmit serial data in accordance with a transmit setting;
a receive section operably coupled to convert receive serial data stream into receive data words in accordance with a receive setting;
an interface to programmable logic section operably coupled to provide the transmit data words from the programmable logic section to the transmit section in accordance with the transmit setting and to receive the receive data words from the receive section in accordance with the receive setting; and
control module operably coupled to produce the transmit setting and the receive setting based on transceiver operational requirements;
wherein the control module further functions to:
generate the receive setting to enable, logically disable, or physically disable at least one element of a programmable PMA receiver module of the receiver section;
generate the transmit setting to enable, logically disable, or physically disable at least one element of a programmable PMA transmit module of the transmit section;
generate the transmit setting to enable, logically disable, or physically disable at least one element of a programmable PCS transmit module of the transmit section; and
generate the receive setting to enable, logically disable, or physically disable at least one element of a programmable PCS receive module of the receive section;
wherein the receive section further comprises:
a programmable physical media attachment (PMA) receive module operably coupled to convert the receive serial data into receive parallel data in accordance with the receive setting; and
a programmable physical coding sublayer (PCS) receive module operably coupled to convert the receive parallel data into the receive data words in accordance with the receive setting; and
wherein the programmable PCS receive module further comprises:
programmable data alignment module operably coupled to align the receive parallel data in accordance with the receive setting to produce aligned data words, wherein size and rate of the aligned data words are set based on the receive setting;
programmable descramble and decode module operably coupled to descramble, decode, or pass the aligned data words in accordance with the receive setting to produce processed aligned data words, wherein the receive setting indicates descrambling, decoding, or passing of the aligned data words, wherein the receive setting further indicates a type of descrambling when the programmable descramble and decode module is descrambling the aligned data words and further indicates a type of decoding when the programmable descramble and decode module is decoding the aligned data words;
programmable storage module operably coupled to elastic store or pass the processed data words in accordance with the receive setting to produce stored data words; and
programmable decode and verify module operably coupled to decode, verify or pass the stored data words in accordance with the receive setting and the programmed logic interface setting to produce the receive data words, wherein the receive setting indicates the decoding, the verifying or the passing of the stored data words, indicates a second type of decoding when the programmable decode and verify module is decoding the stored data words and indicates a type of verifying when the programmable decode and verify module is verifying the stored data words and wherein the programmed logic interface setting indicates rate and size of the received data words.

17. The programmable multi-gigabit transceiver of claim 16, wherein the transmit section further comprises:
a programmable physical coding sublayer (PCS) transmit module operably coupled to convert the transmit data words into transmit parallel data in accordance with the transmit setting; and
a programmable physical media attachment (PMA) transmit module operably coupled to serialize the transmit parallel data in accordance with the transmit setting to produce the transmit serial data.

18. The programmable multi-gigabit transceiver of claim 17, wherein the programmable PMA transmit module further comprises:

phase locked loop operably coupled to produce timing signals in accordance with the transmit setting;

parallel-to-serial module operably coupled to convert the transmit parallel data into the transmit serial data based on the transmit setting, wherein data width of the transmit parallel data and rate of the transmit serial data are set in accordance with the transmit setting; and driver operably coupled to drive the transmit serial data on to a transmission line, wherein drive level of the driver and pre-emphasis settings of the driver is set in accordance with the transmit setting.

19. The programmable multi-gigabit transceiver of claim 17, wherein the programmable PCS transmit module further comprises:

programmable verify module operably coupled to verify or pass the transmit data words in accordance with the transmit setting to produce verified transmit data words and wherein the transmit setting indicates size and rate of the transmit data words;

programmable encoding module operably coupled to encode or pass the verified transmit data words in accordance with the transmit setting to produce encoded data words, wherein the transmit setting indicates a type of encoding when the programmable encoding module is encoding the verified transmit data words;

programmable storage module operably coupled to elastic store or pass the encoded data words in accordance with the transmit setting to produce stored encoded data words; and programmable scrambling module operably coupled to scramble or pass the stored encoded data words in accordance with the transmit setting to produce the transmit parallel data, wherein the transmit setting indicates a type of scrambling when the programmable scrambling module is scrambling the stored encoded data words.

20. The programmable multi-gigabit transceiver of claim 16, wherein the programmable PMA receive module further comprises:

programmable analog front-end operably coupled to amplify and equalize the receive serial data to produce amplified and equalized receive serial data, wherein amplification and equalization performed by the programmable analog front-end are set in accordance with the receive setting;

data and clock recovery module operably coupled to recover data and a clock from the amplified and equalized receive serial data to produce recovered data and a recovered clock, respectively, wherein the data and clock recovery module includes a programmable phase locked loop that is programmed in accordance with the receive setting; and serial-to-parallel module operably coupled to convert the recovered data into the receive parallel data, wherein rate of the receive parallel data and width of the receive parallel data are set in accordance with the receive setting.

21. The programmable multi-gigabit transceiver of claim 16, wherein the control module further functions to:

receive a programming setting that indicates the desired mode of operation for the programmable multi-gigabit transceiver; and convert the programming setting into the receive setting and the transmit setting.

22. A programmable logic device comprises:

a plurality of programmable multi-gigabit transceivers, wherein each of the plurality of programmable multi-gigabit transceivers is individually programmed to a desired transceiving mode of operation in accordance with a plurality of transceiver settings to transceive data;

programmable logic fabric operably coupled to the plurality of programmable multi-gigabit transceivers, wherein the programmable logic fabric is configured to process at least a portion of the data;

control module operably coupled to produce the plurality of transceiver settings based on a desired mode of operation of the programmable logic device;

wherein each of the plurality of programmable multi-giga bit transceivers further comprises:

programmable physical media attachment (PMA) module operably coupled to transmit parallel data into transmit serial data in accordance with a programmed serialization setting of a corresponding one of the plurality of transceiver settings and to convert receive serial data into receive parallel data in accordance with a programmed deserialization setting of the corresponding one of the plurality of transceiver settings;

programmable physical coding sublayer (PCS) module operably coupled to convert transmit data words into the transmit parallel data in accordance with a transmit PMA PCS interface setting of the corresponding one of the plurality of transceiver settings and to convert the receive parallel data into receive data words in accordance with a receive PMA PCS interface setting of the corresponding one of the plurality of transceiver settings; and programmable interface operably to convey the receive data words from the programmable PCS module to the programmable logic fabric section and the convey the transmit data words from the programmable logic fabric section to the programmable PCS module in accordance with a programmed logic interface setting, wherein the control module generates the programmed serialization setting, the programmed deserialization setting, the receive PMA PCS interface setting, the transmit PMA PCS interface setting, and the logic interface setting based on a desired mode of operation for the programmable multi-gigabit transceiver;

wherein the programmable PCS module further comprises:

a programmable PCS receive module operably coupled to convert the receive parallel data into the receive data words in accordance with the receive PMA PCS interface setting; and a programmable PCS transmit module operably coupled to convert the transmit data words into the transmit parallel data in accordance with the transmit PMA PCS interface setting; and wherein the programmable PCS receive module further comprises:

programmable data alignment module operably coupled to align the receive parallel data in accordance with the receive PMA PCS interface setting to produce aligned data words, wherein size and rate of the aligned data words are set based on the receive PMA PCS interface setting;

programmable descramble and decode module operably coupled to descramble, decode, or pass the aligned data words in accordance with the receive PMA PCS interface setting to produce processed aligned data words, wherein the receive PMA PCS interface setting indicates descrambling, decoding, or passing of the aligned data words, wherein the receive PMA PCS interface setting further indicates a type of descrambling when the programmable descramble and decode module is descrambling the aligned data words and further indicates a type of decoding when the programmable descramble and decode module is decoding the aligned data words;

programmable storage module operably coupled to elastic store or pass the processed data words in accordance with the receive PMA PCS interface setting to produce stored data words; and programmable decode and verity module operably coupled to decode, verify or pass the stored data words in accordance with the receive PMA PCS interface setting and the programmed logic interface setting to produce the receive data words, wherein the receive PMA PCS interface setting indicates the decoding, the verifying or the passing of the stored data words, indicates a second type of decoding when the programmable decode and verity module is decoding the stored data words and indicates a type of verifying when the programmable decode and verify module is verifying the stored data words and wherein the programmed logic interface setting indicates rate and size of the received data words.

23. The programmable logic device of claim 22, wherein the programmable PMA further comprises:

a programmable PMA receiver module operably coupled to convert the receive serial data into the receive parallel data in accordance with the programmed deserialization setting; and a programmable PMA transmitter module operably coupled to convert the transmit parallel data into the transmit serial data in accordance with a programmed serialization setting.

24. The programmable logic device of claim 23, wherein the programmable PMA receiver module further comprises:

programmable analog front-end operably coupled to amplify and equalize the receive serial data to produce amplified and equalized receive serial data, wherein amplification and equalization performed by the programmable analog front-end are set in accordance with the programmed deserialization setting;

data and clock recovery module operably coupled to recover data and a clock from the amplified and equalized receive serial data to produce recovered data and a recovered clock, respectively, wherein the data and clock recovery module includes a programmable phase locked loop that is programmed in accordance with the programmed deserialization setting; and serial-to-parallel module operably coupled to convert the recovered data into the receive parallel data, wherein rate of the receive parallel data and width of the receive parallel data are set in accordance with the programmed deserialization setting.

25. The programmable logic device of claim 23, wherein the programmable PMA transmitter module further comprises:

phase locked loop operably coupled to produce timing signals in accordance with the programmed serialization setting;

parallel-to-serial module operably coupled to convert the transmit parallel data into the transmit serial data based on the timing signals, wherein data width of the transmit parallel data and rate of the transmit serial data are set in accordance with the programmed serialization setting; and driver operably coupled to drive the transmit serial data on to a transmission line, wherein drive level of the driver and pre-emphasis settings of the driver is set in accordance with the programmed serialization setting.

26. The programmable logic device of claim 22, wherein the programmable PCS transmit module further comprises:

programmable verify module operably coupled to verify or pass the transmit data words in accordance with the transmit PMA_PCS interface setting and the programmed logic interface setting to produce verified transmit data words and wherein the programmed logic interface setting indicates size and rate of the transmit data words;

programmable encoding module operably coupled to encode or pass the verified transmit data words in accordance with the transmit PMA_PCS interface setting to produce encoded data words, wherein the transmit PMA_PCS interface setting indicates a type of encoding when the programmable encoding module is encoding the verified transmit data words;

programmable storage module operably coupled to elastic store or pass the encoded data words in accordance with the transmit PMA_PCS interface setting to produce stored encoded data words; and programmable scrambling module operably coupled to scramble or pass the stored encoded data words in accordance with the transmit PMA_PCS interface setting to produce the transmit parallel data, wherein the transmit PMA_PCS interface setting indicates a type of scrambling when the programmable scrambling module is scrambling the stored encoded data words.

27. The programmable logic device of claim 22, wherein each of the programmable multi-gigabit transceivers further comprises:

a PMA memory mapped register operable to store element settings for elements of the PMA module as indicated by the programmed serialization setting and the programmed deserialization setting; and PCS register operable to store element settings for elements of the PCS module as indicated by the transmit and receive PMA_PCS interface settings and the programmed logic interface setting.

28. The programmable logic device of claim 27, wherein the control module further functions to:

receive a programming setting that indicates the desired mode of operation for the programmable multi-gigabit transceiver;

convert the programming setting into the programmed serialization setting, the programmed deserialization setting, the receive PMA_PCS interface setting, the transmit PMA_PCS interface setting, and the logic interface setting;

provide the programmed serialization setting and the programmed deserialization setting to the PMA memory mapped register; and provide the transmit and receive PMA_PCS interface settings and the programmed logic interface setting to the PCS register.

29. The programmable logic device of claim 27, wherein the control module further functions to:

determine a programming setting that indicates the desired mode of operation for the programmable multi-gigabit transceiver based on auto-configuration information;

convert the programming setting into the programmed serialization setting, the programmed deserialization setting, the receive PMA_PCS interface setting, the transmit PMA_PCS interface setting, and the logic interface setting;

provide the programmed serialization setting and the programmed deserialization setting to the PMA memory mapped register; and provide the transmit and receive PMA_PCS interface settings and the programmed logic interface setting to the PCS register.

30. The programmable logic device of claim 22, wherein the control module further functions to:

generate the programmed serialization setting to enable, logically disable, or physically disable at least one element of a programmable PMA receiver module of the programmable PMA module;

generate the programmed deserialization setting to enable, logically disable, or physically disable at least one element of a programmable PMA transceiver module of the programmable PMA module;

generate the transmit PMA_PCS interface setting to enable, logically disable, or physically disable at least one element of a programmable PCS transmit module of the programmable PCS module; and generate the receive PMA_PCS interface setting to enable, logically disable, or physically disable at least one element of a programmable PCS receive module of the programmable PCS module.

31. The programmable logic device of claim 22, wherein each of the plurality of programmable multi-gigabit transceivers further comprises:

a transmit section operably coupled to convert transmit data words into an transmit serial data in accordance with a transmit setting;

a receive section operably coupled to convert receive serial data stream into receive data words in accordance with a receive setting;

an interface to programmable logic fabric operably coupled to provide the transmit data words from the programmable logic fabric to the transmit section in accordance with the transmit setting and to provide the receive data words from the receive section to the programmable logic fabric in accordance with the receive setting; and control module operably coupled to produce the transmit setting and the receive setting based on transceiver operational requirements.

32. The programmable logic device of claim 31, wherein the transmit section further comprises:

a programmable physical coding sublayer (PCS) transmit module operably coupled to convert the transmit data words into transmit parallel data in accordance with the transmit setting; and a programmable physical media attachment (PMA) transmit module operably coupled to serialize the transmit parallel data in accordance with the transmit setting to produce the transmit serial data.

33. The programmable logic device of claim 32, wherein the programmable PMA transmit module further comprises:

phase locked loop operably coupled to produce timing signals in accordance with the transmit setting;

parallel-to-serial module operably coupled to convert the transmit parallel data into the receive serial data based on the transmit setting, wherein data width of the transmit parallel data and rate of the transmit serial data are set in accordance with the transmit setting; and driver operably coupled to drive the transmit serial data on to a transmission line, wherein drive level of the driver and pre-emphasis settings of the driver is set in accordance with the transmit setting.

34. The programmable logic device of claim 32, wherein the programmable PCS transmit module further comprises:

programmable verify module operably coupled to verify or pass the transmit data words in accordance with the transmit setting to produce verified transmit data words and wherein the transmit setting indicates size and rate of the transmit data words;

programmable encoding module operably coupled to encode or pass the verified transmit data words in accordance with the transmit setting to produce encoded data words, wherein the transmit setting indicates a type of encoding when the programmable encoding module is encoding the verified transmit data words;

programmable storage module operably coupled to elastic store or pass the encoded data words in accordance with the transmit setting to produce stored encoded data words; and programmable scrambling module operably coupled to scramble or pass the stored encoded data words in accordance with the transmit setting to produce the transmit parallel data, wherein the transmit setting indicates a type of scrambling when the programmable scrambling module is scrambling the stored encoded data words.

35. The programmable logic device of claim 31, wherein the receive section further comprises:

a programmable physical media attachment (PMA) receive module operably coupled to convert the receive serial data into receive parallel data in accordance with the receive setting; and a programmable physical coding sublayer (PCS) receive module operably coupled to convert the receive parallel data into the receive data words in accordance with the receive setting.

36. The programmable logic device of claim 35, wherein the programmable PMA receive module further comprises:

programmable analog front-end operably coupled to amplify and equalize the receive serial data to produce amplified and equalized receive serial data, wherein amplification and equalization performed by the programmable analog front-end are set in accordance with the receive setting;

data and clock recovery module operably coupled to recover data and a clock from the amplified and equalized high-speed receive serial data to produce recovered data and a recovered clock, respectively, wherein the data and clock recovery module includes a programmable phase locked loop that is programmed in accordance with the receive setting; and serial-to-parallel module operably coupled to convert the recovered data into the receive parallel data, wherein rate of the receive parallel data and width of the receive parallel data are set in accordance with the receive setting.

37. The programmable logic device of claim 35, wherein the programmable PCS receive module further comprises:

programmable data alignment module operably coupled to align the receive parallel data in accordance with the receive setting to produce aligned data words, wherein size and rate of the aligned data words are set based on the receive setting;

programmable descramble and decode module operably coupled to descramble, decode, or pass the aligned data words in accordance with the receive setting to produce processed aligned data words, wherein the receive setting indicates descrambling, decoding, or passing of the aligned data words, wherein the receive setting further indicates a type of descrambling when the programmable descramble and decode module is descrambling the aligned data words and further indicates a type of decoding when the programmable descramble and decode module is decoding the aligned data words;

programmable storage module operably coupled to elastic store or pass the processed data words in accordance with the receive setting to produce stored data words; and programmable decode and verify module operably coupled to decode, verify or pass the stored data words in accordance with the receive setting and the programmed logic interface setting to produce the receive data words, wherein the receive setting indicates the decoding, the verifying or the passing of the stored data words, indicates a second type of decoding when the programmable decode and verify module is decoding the stored data words and indicates a type of verifying when the programmable decode and verify module is verifying the stored data words and wherein the programmed logic interface setting indicates rate and size of the received data words.

38. The programmable logic device of claim 31, wherein the control module further functions to:

receive a programming setting that indicates the desired mode of operation for the programmable multi-gigabit transceiver; and convert the programming setting into the receive setting and the transmit setting.

39. The programmable logic device of claim 31, wherein the control module further functions to:

generate the receive setting to enable, logically disable, or physically disable at least one element of a programmable PMA receiver module of the receiver section;

generate the transmit setting to enable, logically disable, or physically disable at least one element of a programmable PMA transceiver module of the transmit section;

generate the transmit setting to enable, logically disable, or physically disable at least one element of a programmable PCS transmit module of the transmit section; and generate the receive setting to enable, logically disable, or physically disable at least one element of a programmable PCS receive module of the receive section.

* * * * *